United States Patent [19]

Johnson et al.

[11] 4,253,148
[45] Feb. 24, 1981

[54] DISTRIBUTED SINGLE BOARD COMPUTER INDUSTRIAL CONTROL SYSTEM

[75] Inventors: William D. Johnson, Dallas; Donald L. Ewing, Richardson; James S. Grisham, Jr., Arlington, all of Tex.

[73] Assignee: Forney Engineering Company, Carrollton, Tex.

[21] Appl. No.: 37,189

[22] Filed: May 8, 1979

[51] Int. Cl.³ .......................... G06F 9/36; G06F 9/46; G06F 15/16; G06F 15/46
[52] U.S. Cl. .................................................. 364/200
[58] Field of Search ............................. 364/200, 300

[56] References Cited

U.S. PATENT DOCUMENTS

| | | | |
|---|---|---|---|
| 3,496,551 | 2/1970 | Driscoll et al. | 364/200 |
| 3,665,487 | 5/1972 | Campbell et al. | 364/200 |
| 4,110,823 | 8/1978 | Cronshaw et al. | 364/200 |
| 4,124,889 | 11/1978 | Kaufman et al. | 364/200 |
| 4,142,232 | 2/1979 | Harvey | 364/200 |
| 4,161,027 | 7/1979 | Russell | 364/200 |
| 4,177,514 | 12/1979 | Rupp | 364/200 |

Primary Examiner—Harvey E. Springborn
Attorney, Agent, or Firm—Marvin A. Naigur; John E. Wilson; John J. Herguth, Jr.

[57] ABSTRACT

An industrial control system in accordance with the present invention is provided with a plurality of diverse controlled devices (e.g., fans, pumps, valves, solenoids, relays, etc.) for effecting overall system control. Each device has a unique set of logic control functions and/or command sequences and is connected, through an input/output interface, to a stored-program single board computer that provides device control and monitoring. The computers each include a central processor controlled by a composite or "master" program which is common to all the computers and which includes instruction sequences for all logic control functions and command sequences that exist within the system. A user alterable interconnection device (UAID) permits only those logic control function and/or command sequence portions of the master program that relate to a particular one of the controlled devices to operatively connect with the particular input/output ports associated with that controlled device. As the master program successively loops, only those logic control functions and/or command sequences that relate to the particular controlled device, as determined by the user alterable interconnection device, are operative to address the input-output ports associated with the controlled device and thereby effect device control and monitoring. The invention permits simple and efficient dedication of a plurality of single board computers having only one master program to an equal member of diverse controlled devices without the drawbacks normally associated with dedicated stored-program controllers.

13 Claims, 11 Drawing Figures

| LOC | OBJ | SEQ | SOURCE STATEMENT | UAID LOCATION | ELECTRICALLY OPERATED BREAKER (FIG. 6) | SOLENOID OPERATED VALVE (FIG. 2) |
|---|---|---|---|---|---|---|
| 00CA | 2A2820 | 139 | LHLD SAPPP+2*14H | | | |
| 00CD | 46 | 140 | MOV B,M ,I/O INPUT #14 | 202B | E010 (Start SW) | E010 (Start SW) |
| 00CE | 2A3820 | 141 | LHLD SAPPP+2*1CH | | | |
| 00D1 | 70 | 142 | MOV M,B ,I/O OUTPUT #1C | 203B | E039 (Start Comm.) | FFFF (Spare) |
| 00D2 | 2A2A20 | 143 | LHLD SAPPP+2*15H | | | |
| 00D5 | 4E | 144 | MOV C,M ,I/O INPUT #15 | 202A | E011 (Stop SW) | E011 (Stop SW) |
| 00D6 | 2A3A20 | 145 | LHLD SAPPP+2*1DH | | | |
| 00D9 | 71 | 146 | MOV M,C ,I/O OUTPUT #1D | 203A | E038 (Stop Comm.) | FFFF (Spare) |
| 00DA | 2A2C20 | 147 | LHLD SAPPP+2*16H | | | |
| 00DD | 7E | 148 | MOV A,M ,I/O INPUT #16 | 202C | E03C (Breaker-in test position) | FFFF (Spare) |
| 00DE | 2A3C20 | 149 | LHLD SAPPP+2*1EH | | | |
| 00E1 | 77 | 150 | MOV M,A ,I/O OUTPUT #1E | 203C | E01A (Breaker-in test position light out) | FFFF (Spare) |

FIG. 11.

DISTRIBUTED SINGLE BOARD COMPUTER INDUSTRIAL CONTROL SYSTEM

BACKGROUND OF THE INVENTION

The present invention relates to industrial control systems that employ a large number of controlled devices and, more particularly, to industrial control systems which utilize a single board computer (SBC) associated with and for controlling each controlled device.

Many system-type industrial installations, for example, power generating stations, employ a large number of controlled devices for effecting coordinated operation of the overall system. These controlled devices include, for example, motors, pumps, compressors, various types of electrically operated valves, transmissions, instruments, solenoids, relays, and the like. Each of these controlled devices has a particular set of logic function or control signals and/or command sequences that must be effected to ensure proper device operation. These logic function signals and command sequences include, for example, enable signals, stand-by signals, turn-on signals, turn-off signals, run-up and run-down sequences, time delays, emergency stop signals, and various alarm condition signals.

In the past, coordinated control of the various devices has been achieved by manual operation and various types of semi-automatic and automatic control systems including electromagnetic relay systems, hard-wired solid-state logic systems, computer control systems in which the controlled devices are connected to and controlled from a central computer and, more recently, distributed computer control systems in which a single board computer is connected to each controlled device with each computer having a program dedicated to the particular controlled device.

While both types of computer-oriented control systems, that is, the central computer arrangement and the distributed computer arrangement, provide effective system control, a number of drawbacks are associated with the introduction of computer control within a control system.

In a large control system, e.g., a control system for a power generating installation, a substantial programming effort must be undertaken to provide software for each of the controlled devices within the system. In installations using a large central computer, this programming effort is lessened somewhat by the ready availability of sophisticated high-level program languages that permit a relatively unskilled system controller to structure the necessary control programs. These sophisticated languages oftentimes include subroutines, e.g., query prompters and graphic display subroutines, that assist and guide the system control personnel in structuring the programs.

On the other hand, single board computers are generally programmed in low-level assembly-type languages or machine language codes, and, as a consequence, many system users are reluctant to employ distributed single board computers because of the difficulty in obtaining or training personnel to program the computers. As a practical consequence, system users employing single board computers are dependent upon their computer suppliers or other consultants for these control programs.

Other drawbacks that are associated with distributed single board computer systems are that maintenance personnel, who are not usually trained in programming, must have a large inventory of preprogrammed single board computers with which to conduct "remove and replace" type troubleshooting. Also, the replacement of a defective controlled device with an updated or modified replacement oftentimes requires that the control program within the associated control computer be modified to reflect the updated or modified control function and/or command sequence logic of the replacement device.

The time and cost problems associated with developing a control system having a large number of controlled devices with a single board computer for each device does not normally prevent this type of system from being used in newly designed industrial systems. However, the same time and cost factors can prevent, or at least inhibit, cost effective retrofitting of existing industrial installations with dedicated single board computers because of the time required to identify the logic control functions and control sequences of operating equipment and the downtime that may be required to prepare and test a dedicated program for each single board computer.

SUMMARY OF THE INVENTION

In view of the above, it is a broad, overall, object of the present invention, among others, to provide a distributed single board computer industrial control system which does not have the programming drawbacks normally associated with systems of this type.

It is another object of the present invention to provide a distributed single board computer industrial control system in which each of the computers has a common master program and in which each computer can be easily adapted to a particular application without modification of the master program.

It is still another object of the present invention to provide a distributed single board computer industrial control system in which each computer has a common master program and in which a worker, relatively unskilled in programming, can easily adapt each computer to a particular application.

It is a further object of the present invention to provide a distributed single board computer industrial control system in which each computer has a common master program and in which selected portions of the master program relating to particular logic control functions and/or command sequences can be operatively associated with a particular controlled device to effect control and monitoring of that device.

In accordance with the present invention, an industrial control system having a plurality of controlled devices is provided with a single board computer connected to each device through an input/output interface. Each computer is controlled by a master or composite program that includes program steps adapted to achieve control and monitoring of all possible logic control functions and command sequences that exist within the system. A user alterable interconnection device (UAID) allows only those portions of the master program that relate to the logic control functions and/or control sequences of a particular controlled device to be operatively connected with the input/output ports associated with that device. As the single board computer continuously and successively loops through the master program, only those program steps that relate to the logic control functions and/or control sequences for the controlled device are operative, as determined by the UAID, to effect control and monitoring of the controlled device.

An industrial control system in accordance with the present invention possesses a number of advantages when compared to prior control systems. Once the logic control functions and command sequences for the various diverse controlled devices of a particular control system, for example, for a power generating plant, are established, only one master program is written to include all the logic control functions and command sequences for all the possible controlled devices within the system. The user alterable interconnection device may then be conveniently configured for each controlled device in a simple, straight-forward manner to easily adapt each single board computer to a particular controlled device.

In the preferred form, each single board computer includes a central processor and its associated support circuitry, a programmable peripheral interface device (PPI) for interfacing the processor with a data highway and a central, supervisory computer, a program memory store that contains the master program (which is common to all the computers within the system), and a user alterable interface device (UAID) in the form of a field programmable read-only-memory (PROM) for operatively interconnecting those selected portions of the master program that relate to a particular controlled device with the input/output ports of that device.

Each master program for a particular control system includes sequentially arranged instructions which are designed to effect the various logic control functions and command sequences for every controlled device within the system. These instructions can cause the processor to, for example, query one or more input ports to determine the status of various sensor switches, query power lines to determine the presence or absence of power, perform various logical and computational operations, supply command signals to various output ports to effect control, and the like. The UAID is assigned a predetermined block of the available memory addresses, these addresses being termed "fictitious addresses." As the master program loops the central processor, operating in an indirect programming mode, looks or refers to the UAID address for its input/output information. In single board computers that have not been adapted to a particular controlled device, each of the UAID addresses contain a nonfunctional address such as a preselected address or nonexistant address. In a single board computer that has been dedicated to a particular controlled device, selected locations within the UAID that relate to a particular logic control function and/or command sequence for the controlled device are provided with the actual addresses of the input/output ports associated with that device. As the master program loops, the portions of the master program that relate to or correspond to the logic control functions and/or command sequences of a particular controlled device address UAID locations that contain the actual addresses of the input/output ports of the controlled device. In order to dedicate a single board computer to a particular device, all that is necessary is that the particular logic control function and/or command sequences for the device be identified and that the particular addresses within the UAID that relate to the so-identified portions of the program be provided with the actual input/output addresses of the controlled device.

In an average or representative application, it is contemplated that the master program may address upwardly of several hundred addresses within a UAID and only a few, perhaps 1-20%, of the available UAID addresses will contain actual input/output address information. Thus, the master program will continuously address a large number of UAID addresses and be operatively connected with only a few actual input/output ports selected by the UAID for the particular controlled device.

From a historical standpoint, the present invention is countercurrent to those trends which have maximized program efficiency and memory space utilization to reduce system costs. While the program efficiency and memory utilization of the present invention may appear low, the ease and simplicity with which each single board computer can be adapted to a particular controlled device obviates these apparent inefficiencies.

Since the computer user merely has to load a relatively few input/output addresses into easily selected locations of the UAID, the user need not have a knowledge of processor programming. For those control system personnel who are familiar with and comfortable with prior electromechanical and solid-state control systems that traditionally have employed patch panel type interconnects using "jumper" links, the present invention provides obvious conceptual similarities and analogies. In this regard, the present invention, by eliminating the drawbacks associated with programming single board computers and by having patch-panel analogies to prior control systems, substantially overcomes the reluctance of control system personnel to accept distributed single board computer systems.

BRIEF DESCRIPTION OF THE DRAWINGS

The above brief description as well as the objects, features, and advantages of the present invention will be more fully appreciated by reference to the following detailed description of a presently preferred, but nonetheless illustrative, embodiment in accordance with the present invention, when taken in connection with the accompanying drawings wherein:

FIG. 11 is a reproduction of a selected portion of a control program suitable for use with a single board computer illustrated in FIGS. 8A and 8B.

DESCRIPTION OF THE PREFERRED EMBODIMENT

Figure 1:
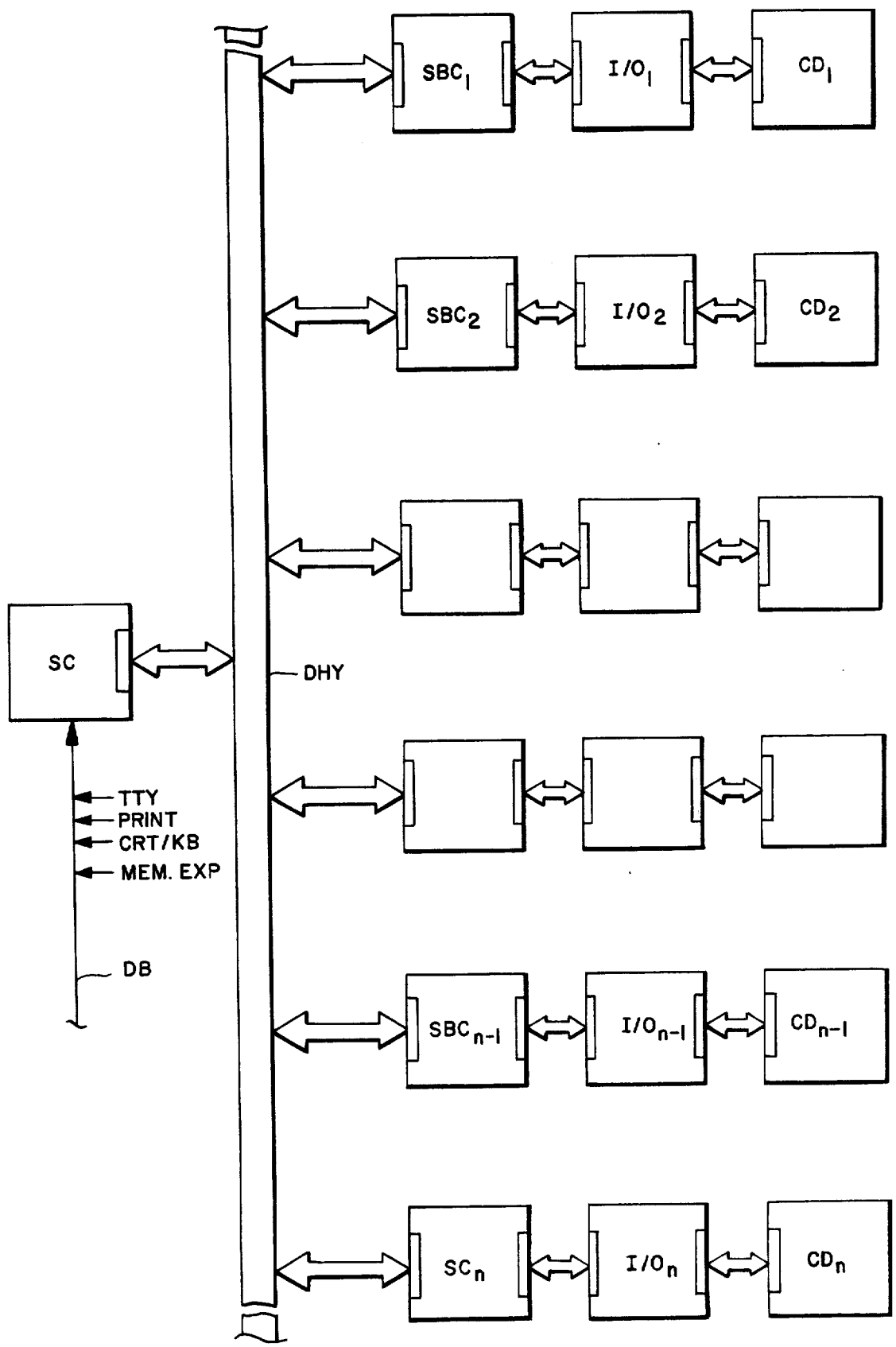
FIG. 1 is a schematic representation of the overall organization of an industrial control system in accordance with the present invention in which a plurality of controlled devices are connected to an associated single board computer through an input/output interface.

The architecture of a distributed processor industrial control system in accordance with the present invention, as shown in FIG. 1, includes a plurality of diverse controlled devices $CD_1, CD_2, \ldots CD_{n-1}, CD_n$ each of which is connected through an associated input/output board $I/O_1, I/O_2, \ldots I/O_{n-1}, I/O_n$ to a single board computer $SBC_1, SBC_2, \ldots SBC_{n-1}, SBC_n$ which are, in turn, interconnected through a bidirectional data highway or intercommunication buss DHY to a central, supervisory computer SC. An auxilliary data buss DB may be used to connect the supervisory computer SC to a teletype terminal, a printer, a CRT/keyboard terminal, another control system and/or additional memory. The control system of the preferred embodiment is designed as a plant auxilliary control system (PAC) for a power generating station. The devices normally found in a PAC system include, but are not limited to, motor-operated valves, fans, pumps, and compressors; relay-operated devices; solenoid-operated devices; and various types of electromagnetic actuators used to operate various types of valves and the like. The controlled devices also usually include various sensors, e.g., limit switches or other transducers which monitor or determine the operating characteristics or state of the controlled device, which determine whether or not a device is open or closed, running or not running, functional or not functional, and which determine whether or not the electrical windings associated with the controlled device are continuous or interrupted.

Each controlled device has a particular set of logic control functions and/or command sequences that determine proper operation of the device. The logic diagrams for several exemplary controlled devices are shown in FIGS. 2-7. Each of these diagrams illustrates the various logical function operators or elements and their logical relationships or interconnections needed to effect device control and monitoring including the logic required to determine the operating or functional status of the controlled device, to initiate a command, to determine if the controlled device is responding as commanded, and determine the presence or absence of various malfunction and alarm conditions.

Figure 2:
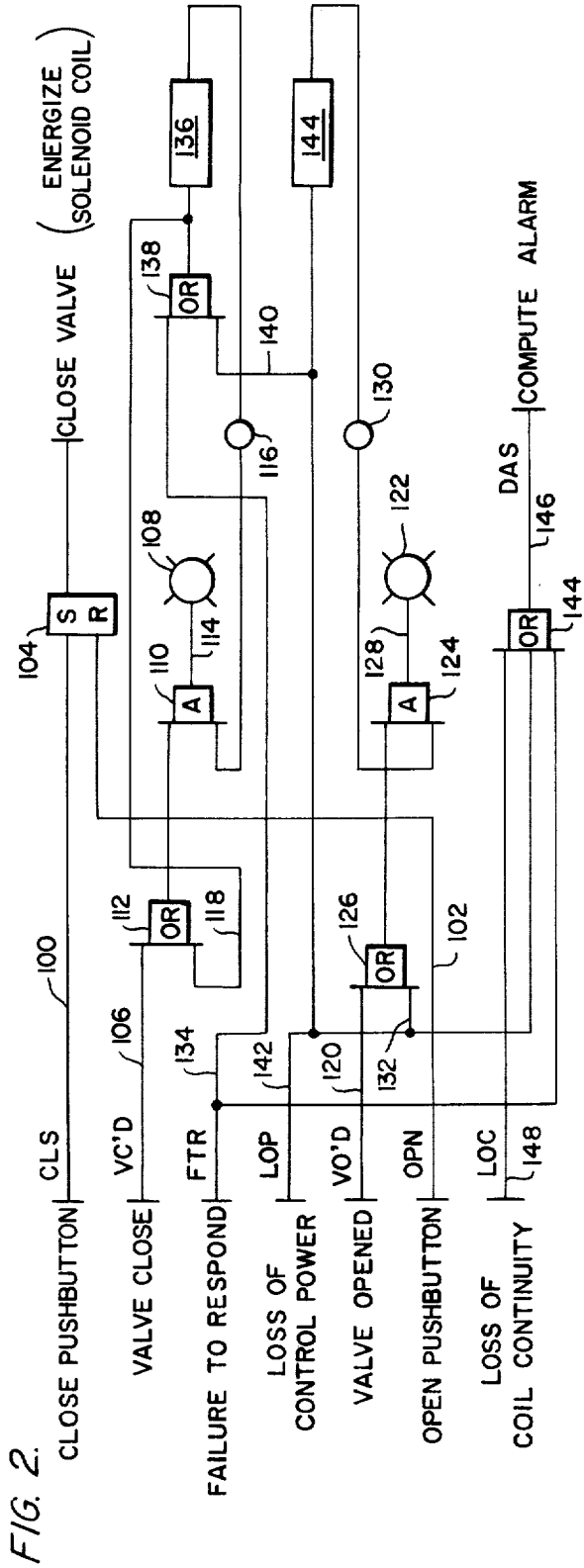
FIG. 2 is a logic diagram representing the logic control functions and command sequences for a single-coil solenoid operated valve.

The logic diagram of FIG. 2 represents the basic logic function operations and control sequences for a single coil, solenoid-operated valve in which the valve is closed when the solenoid coil (not shown) is energized and the valve is opened when the coil is de-energized.

The 'close valve' and 'open valve' input signals CLS and OPN are provided, respectively, on lines 100 and 102 which are connected, respectively, to the S and R inputs of RS latch 104. When a 'close valve' input signal CLS is provided on line 100, the RS latch 104 is set to provide an output command signal to energize the solenoid coil and close the valve, and when an 'open valve' input signal OPN is provided on line 102, the RS latch 104 is reset to de-energize the solenoid coil.

A 'valve is closed' indication signal VC'D is provided by an appropriate switch or sensor (not shown) on line 106 and is used to actuate a valve closed indicator 108 through an AND logical operator 110 and an OR logical operator 112. The indicator 108 receives its valve closed actuation signal along line 114 from the AND logical operator 110 which receives the output of the OR logical operator 112 and the complement of the inclusive OR result of a 'failure to respond' warning signal FTR and a 'loss of power' warning signal LOP provided through complementing operator 116. The OR logical operator 112 receives the 'valve is closed' indication signal VC'D along line 106 and the inclusive OR result of the 'failure to respond' warning signal FTR and the 'loss of power' warning signal LOP provided on line 118.

A 'valve is open' indication signal VO'D is provided by an appropriate switch or sensor (not shown) on line 120 and is used to actuate a valve opened indicator 122 through an AND logical operator 124 and an OR logical operator 126. The indicator 122 receives its valve opened actuation signal along line 128 from the AND logical operator 124 which receives the output of the OR logical operator 126 and the complement of the 'loss of power' warning signal LOP provided through complementing operator 130. The OR logical operator 126 receives the 'valve is open' indication signal VO'D along line 120 and the 'loss of power' warning signal LOP provided on line 132.

The 'failure to respond' warning signal FTR on line 134 and the 'loss of power' warning signal LOP on line 142 are both connected to the input of OR logical operator 138. The output of the OR logical operator 138 is connected to the input of OR logical operator 112 along line 118 and to a flasher unit 136 which, when actuated, provides a periodically interrupted output signal through complementary operator 116 to AND logical operator 110 and the indicator 108. The 'loss of power' warning signal LOP on line 142 is connected directly to a flasher unit 144 which, when actuated, provides a periodically interrupted output signal through the complementing operator 130 to the AND logical operator 124 and the indicator 122.

A 'computer alarm' indication DAS is provided along line 146 from the output of an OR logical operator 144 which receives, as its inputs, the 'loss of power' warning signal LOP from line 142, the 'failure to respond' warning signal FTR from line 134, and a 'loss of continuity' warning signal LOC along line 148.

When a 'close valve' input signal or an 'open valve' input signal, CLS or OPN, is provided, respectively, on line 100 or 102, the RS latch 104 is set or reset to provide an output command signal to energize or de-energize the solenoid coil and close or open the valve. When the valve reaches its closed or open position, the indicators 108 or 122 provide the proper indication thereof, and, should a failure to respond or a loss of power condition arise, the appropriate indicator 108 and/or 122 is actuated to provide a flashing indication. In addition, a computer alarm is provided should there be a failure to respond, a loss of power, or a loss of coil continuity condition detected.

Figure 3:
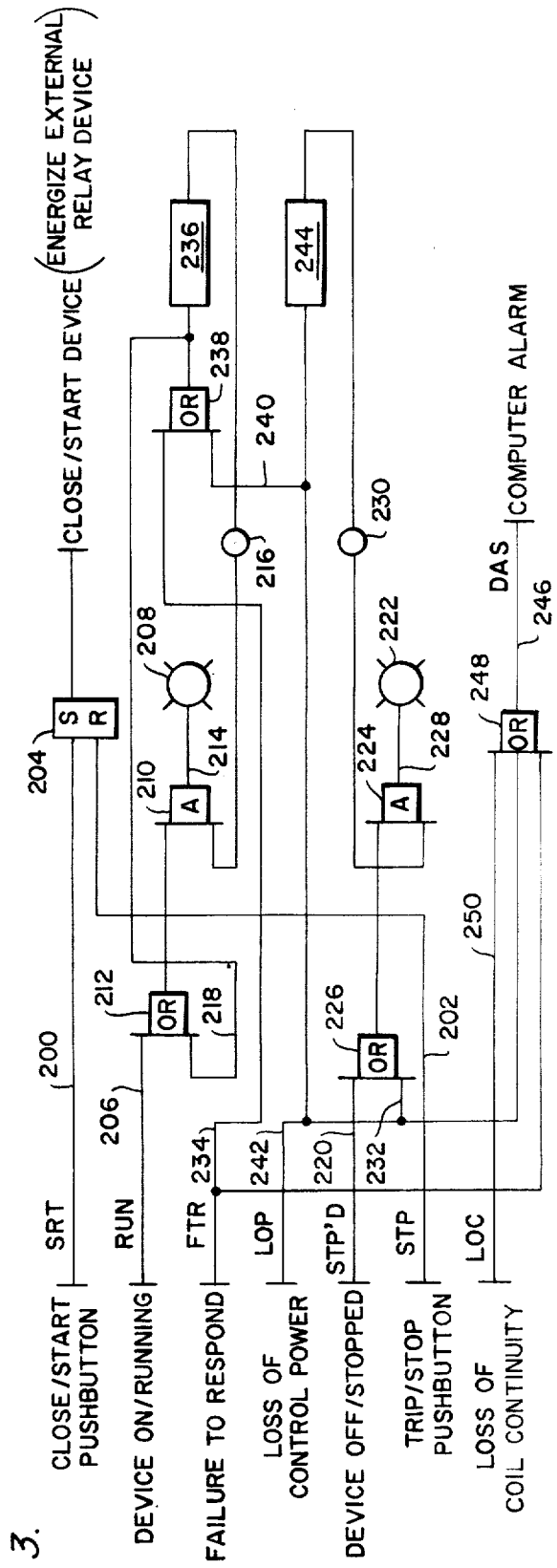
FIG. 3 is a logic diagram representing the logic control functions and command sequences for a relay-type controller.

The logic diagram of FIG. 3 represents the basic logic function operations and control sequences for a relay-operated device in which the device is started when the relay is closed and the device is stopped when the relay is tripped to its open position.

The 'device start' and 'device stop' input signals SRT and STP are provided, respectively, on lines 200 and 202 which are connected, respectively, to the S and R inputs of RS latch 204. When a 'device start' input signal SRT is provided on line 200, the RS latch 204 is set to provide an output command signal to energize the relay coil (not shown) and start the controlled device, and when a 'device stop' input signal STP is provided on line 202, the RS latch 204 is reset to de-energize or trip the relay open.

A 'device is running' indication signal RUN is provided by an appropriate sensor (not shown) on line 206 and used to actuate a device-running indicator 208 through an AND logical operator 210 and an OR logical operator 212. The indicator 208 receives its device running actuation signal along line 214 from the AND logical operator 210 which receives the output of the OR logical operator 212 and the complement of the inclusive OR result of a 'failure to respond' warning signal FTR and a 'loss of power' warning signal LOP provided through complementing operator 216. The OR logical operator 212 receives the 'device is running' indication signal RUN along line 206 and the inclusive OR result of the 'failure to respond' warning signal FTR and the 'loss of power' warning signal LOP along line 218.

A 'device is stopped' indication signal STP'D is provided by an appropriate sensor (not shown) on line 220 and used to actuate a device-stopped indicator 222 through an AND logical operator 224 and an OR logical operator 226. The indicator 222 receives its device-stopped actuation signal along line 228 from the AND logical operator 224 which receives the output of the OR logical operator 226 and the complement of the 'loss of power' warning signal LOP provided through complementing operator 230. The OR logical operator 226 receives the 'device is stopped' indication signal STP'D along line 220 and the 'loss of power' warning signal LOP along line 232.

The 'failure to respond' warning signal FTR on line 234 and the 'loss of power' warning signal LOP on line 242 are both connected to the input of OR logical operator 238. The output of the OR logical operator 238 is connected to the input of OR logical operator 212 along line 218 and to a flasher unit 236 which, when actuated, provides a periodically interrupted output signal through complementary operator 216 to AND logical operator 210 and the indicator 208. The 'loss of power' warning signal LOP on line 242 is connected directly to a flasher unit 244 which, when actuated, provides a periodically interrupted output signal through complementing operator 230 to the AND logical operator 224 and the indicator 222.

A 'computer alarm' indication DAS is provided along line 246 from the output of an OR logical operator 248 which receives, as its inputs, the 'loss of power' warning signal LOP from line 242, the 'failure to respond' warning signal FTR from line 234, and a 'loss of continuity' warning signal LOC along line 250.

When a 'device start' input signal or a 'device stop' input signal, SRT or STP, is provided, respectively, on line 200 or line 202, the RS latch 204 is set or reset to close or trip open the relay and start or stop the controlled device. When the device is in its run or stop modes, the indicator 208 or 222 provides the proper indication thereof, and, should a failure to respond condition or a loss of power condition arise, the appropriate indicator 208 and/or 222 is actuated to provide a flashing indication. In addition, a computer alarm is provided should there be a failure to respond, a loss of power, or a loss of coil continuity condition detected.

Figure 4:
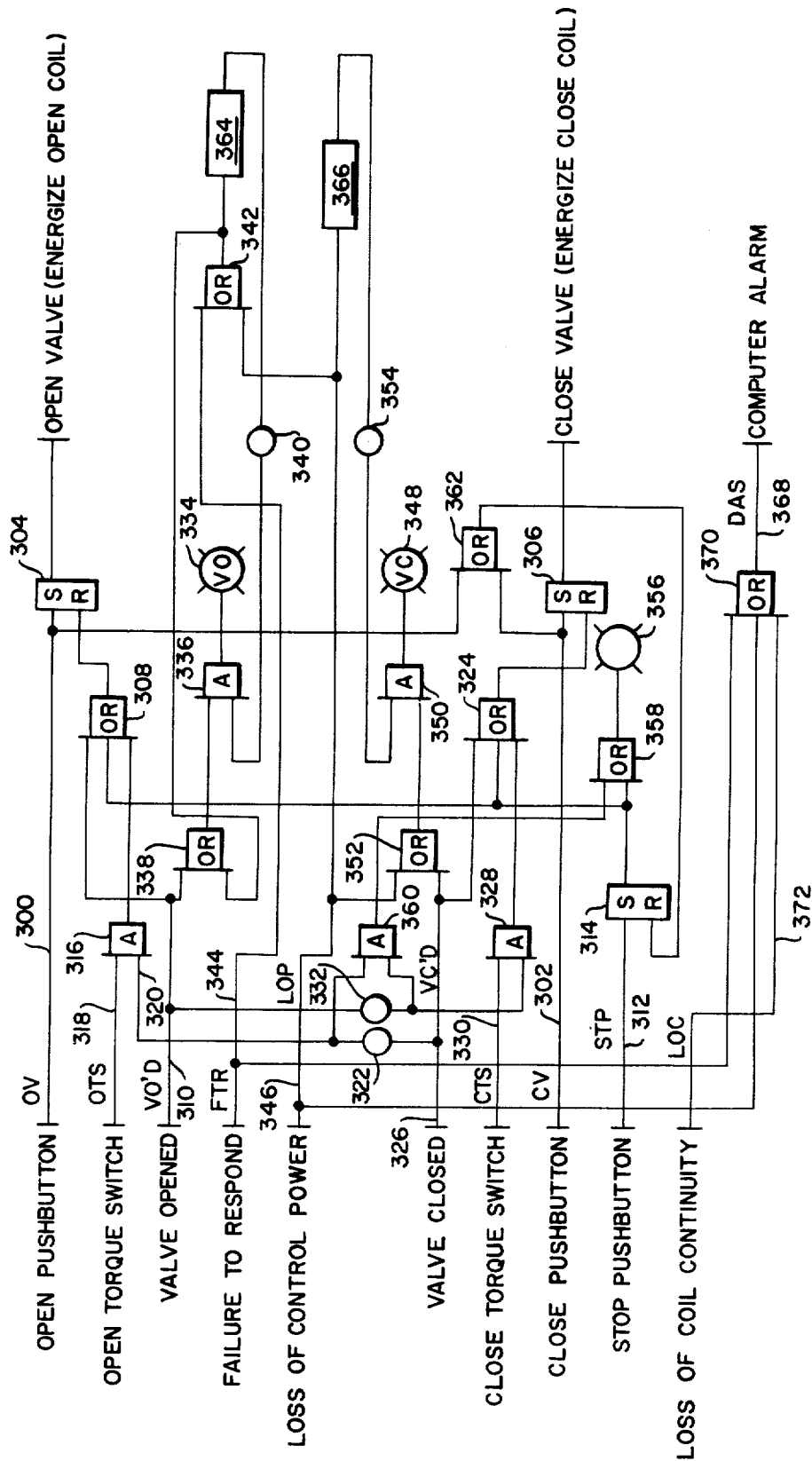
FIG. 4 is a logic diagram representing the logic control functions and command sequences for a latched-drive motor operated valve.

FIG. 4 illustrates a logic diagram for a motor operated valve (not shown) which is actuated to its open or closed position by selectively energizing and latching an open coil or energizing and latching a close coil.

The 'open valve' input signal OV and the 'close valve' input signal CV are provided, respectively, along lines 300 and 302 that are connected, respectively, to the S inputs of RS latches 304 and 306. The outputs of these two latches are connected to and adapted to provide output command signals to energize and latch, respectively, the open coil and the close coil of the controlled valve. The R input of the RS latch 304 is connected to an OR logical operator 308 which resets the RS latch 304 when a 'valve is open' indication signal VO'D is received from line 310, a 'stop' input signal STP is received from line 312 through an RS latch 314, and a signal from AND logical operator 316 which provides an output when coincidence occurs between an 'open torque switch' indication signal OTS along line 318 and the complement of a 'valve is closed' indication signal VC'D provided on line 320 through a complementing operator 322. The R input of the RS latch 306 is connected to an OR logical operator 324 which resets the RS latch 306 when a 'valve is closed' indication signal VC'D is received from line 326, the 'stop' input signal STP on line 312 from RS latch 314, and/or a signal from AND logical operator 328 which provides an output when coincidence occurs between a 'close torque switch' indication signal CTS along line 330 and the complement of the 'valve is open' indication signal VO'D provided from line 310 through complementing operator 332.

The 'valve is opened' indication signal VO'D is provided on line 310 from a suitable sensor (not shown) and used to actuate a valve opened indicator 334 through an AND logical operator 336 and an OR logical operator 338. The indicator 334 receives its valve opened actuation signal from the AND logical operator 336 which receives the output of the OR logical operator 338 and the complement of the inclusive OR result of the 'failure to respond' warning signal FTR and the 'loss of power' warning signal LOP through complementing operator 340. The OR logical operator 338 receives the 'valve is opened' indication signal VO'D along line 310 and another signal from OR logical operator 342 that is the inclusive OR result of the 'failure to respond' warning signal FTR provided on line 344 and the 'loss of power' warning signal LOP provided on line 346.

A 'valve is closed' indication signal VC'D is provided from an appropriate switch or sensor (not shown) on line 326 and is used to actuate a valve closed indicator 348 through an AND logical operator 350 and an OR logical operator 352. The indicator 348 receives its valve closed actuation signal from the AND logical operator 350 which receives the output of the OR logical operator 352 and the complement of the 'loss of power' indication signal LOP through a complementing operator 354. The OR logical operator 352 receives the 'valve is closed' indication signal VC'D along line 326 and the 'loss of power' indication signal LOP from line 346.

The 'stop' input signal STP is provided on the line 312 and used to actuate a stop indicator 356 through an OR logical operator 358 and the RS latch 314. The indicator 356 receives its signal from the OR logical operator 358 which receives an output signal from the RS latch 314 when the latch is set by the stop signal STP on line 312 and a signal from AND logical operator 360 which provides a signal when coincidence occurs between the complement of the 'valve is closed' indication signal VC'D provided by complementing operator 322 and the complement of the 'valve is opened' indication signal VO'D provided by the complementing operator 332. The RS latch 314 is reset by an appropriate signal from the OR logical operator 362 which provides the inclusive OR result of the 'close valve' input signal CV from line 302 and the 'open valve' input signal OV from line 300.

The 'failure to respond' warning signal FTR on line 344 and the 'loss of power' warning signal LOP on line 346 are both connected to the input of OR logical operator 342. The output of the OR logical operator 342 is connected to the input of OR logical operator 338 and to a flasher unit 364 which, when actuated, provides a periodically interrupted output signal through complementary operator 340 to AND logical operator 336 and the indicator 334. The 'loss of power' warning signal LOP on line 346 is connected directly to a flasher unit 336 which, when actuated, provides a periodically interrupted output signal through the complementing operator 354 to the AND logical operator 350 and the indicator 348.

A 'computer alarm' indication DAS is provided along line 368 from the output of an OR logical operator 370 which receives, as its inputs, the 'loss of power' warning signal LOP from line 346, the 'failure to respond' warning signal FTR from line 344, and a 'loss of continuity' warning signal LOC along line 372.

When a 'open valve' input signal OV is provided on line 300, the RS latch 304 is set to provide an output command signal to energize the open coil. When the valve reaches its open position, the 'valve is open' indication signal VO'D on line 310 is passed through OR logical operator 308 to reset the RS latch 304 to de-energize the open coil, the valve thereafter being latched in its open position. When a 'close valve' input signal CV is provided on line 302, the RS latch 306 is set to provide an output command signal to energize the close coil. When the valve reaches its closed position, the 'valve is closed' indication signal VC'D on line 326 through the OR logical operator 324 acts to reset the RS latch 306 and de-energize the close coil, the valve being thereafter latched in the closed position.

Figure 5:
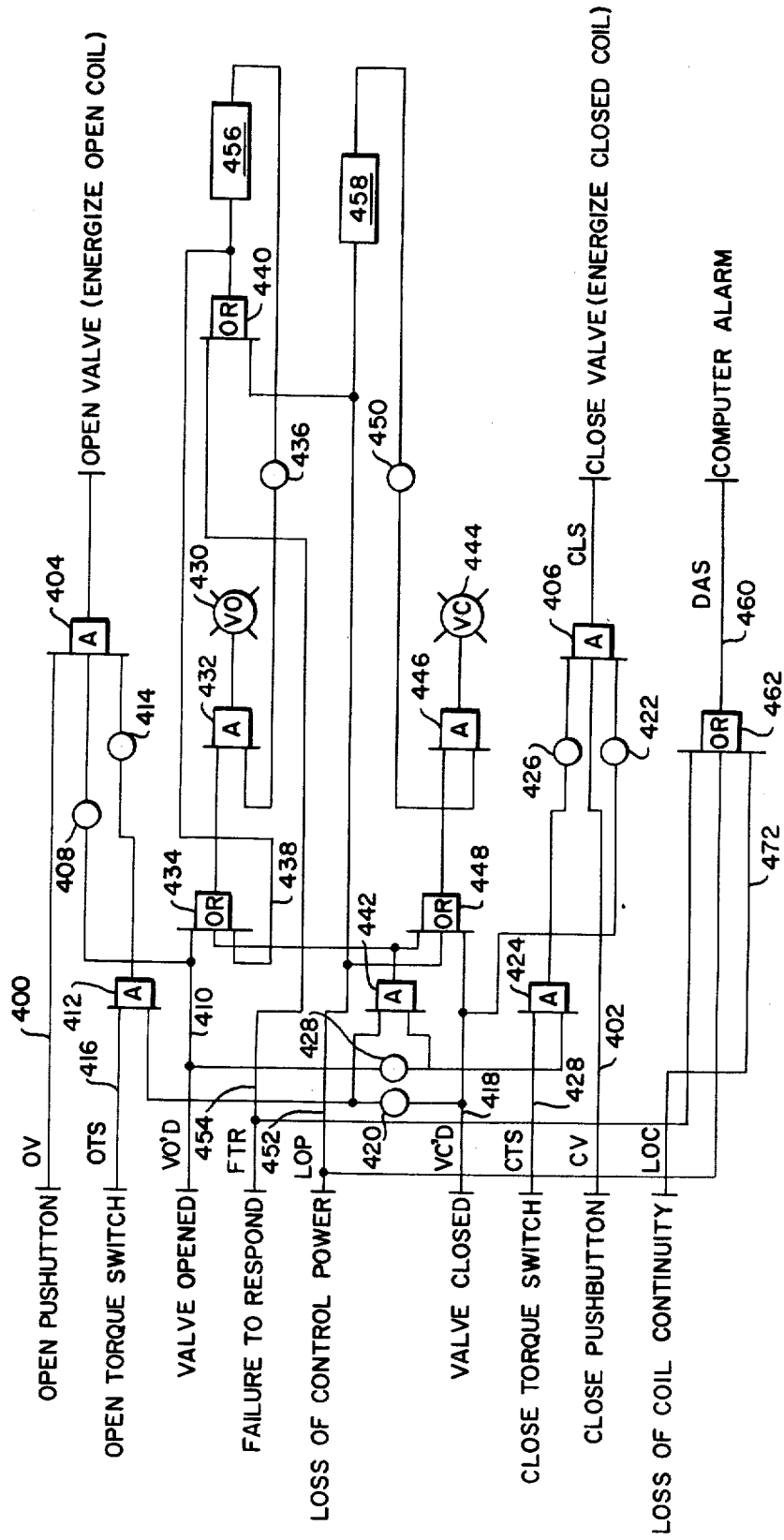
FIG. 5 is a logic diagram representing the logic control functions and command sequences for a momentary drive motor operated valve.

FIG. 5 illustrates a logic diagram for a motor-operated valve (not shown) which is actuated toward and to its open or closed position by energizing a valve open coil or energizing a valve close coil.

The 'open valve' input signal OV and the 'close valve' input signal CV are provided, respectively, along lines 400 and 402 which are connected, respectively, to the inputs of AND logical operators 404 and 406.

The AND logical operator 404 provides an output command signal to energize the open coil of the valve when coincidence occurs between the 'open valve' input signal OV on line 400, the complement of the 'valve is opened' indication signal VO'D provided through a complementing operator 408 from line 410, and the complement of the output of AND logical operator 412 provided through a complementing operator 414. The AND logical operator 412 provides an output when coincidence occurs between an 'open torque switch' warning signal on line 416 and the complement of the 'valve is closed' indication signal VC'D provided on line 418 through complementing operator 420.

The AND logical operator 406 provides an output to energize the close coil of the valve when coincidence occurs between the 'close valve' command signal CV on line 402, the complement of the 'valve is closed' indication signal VC'D from line 418 through complementing operator 422, and the complement of the output of AND logical operator 424 provided through complementing operator 426. The AND logical operator 424 provides an output when coincidence occurs between the 'closed torque switch' warning signal CTS on line 428 and the complement of the 'valve is opened' indication signal VO'D from line 410 provided through complementing operator 428.

The 'valve is opened' indication signal VO'D provided on line 410 from a suitable sensor is used to actuate a valve opened indicator 430 through an AND logical operator 432 and an OR logical operator 434. The indicator 430 receives its valve opened actuation signal from the AND logical operator 432 which provides an output when coincidence occurs between the output of the OR logical operator 434 and the complement of inclusive OR result of the 'failure to respond' warning signal FTR and the 'loss of power' warning signal LOP provided through complementing operator 436. The OR logical operator 434 receives the 'valve is opened' indication signal VO'D along line 410, a signal along line 438 which is the inclusive OR result of the 'loss of power' warning signal LOP and the 'failure to respond' warning signal FTR provided through OR logical operator 440, and another signal from the output of AND logical operator 442. This last logical operator provides an output when coincidence occurs between the complement of the 'valve is closed' indication signal VC'D from line 418 provided through complementing operator 420 and the complement of the 'valve is opened' indication signal VO'D from line 410 provided through complementing operator 428.

The 'valve is closed' indication signal VC'D provided on line 418 is used to actuate a valve closed indicator 444 through an AND logical operator 446 and an OR logical operator 448. The indicator 444 receives its valve closed actuation signal from the AND logical operator 446 which receives the output of the OR logical operator 448. The AND logical operator 446 provides an output indication when coincidence occurs between the complement of the 'loss of power' indication signal LOP provided through a complementing operator 450 and the output of the OR logical operator 448. This latter logical operator receives the 'valve is closed' indication signal VC'D along line 418, the 'loss of power' warning signal LOP from line 452, and another signal from the output of the AND logical operator 442, the inputs of which were described above in connection with the operation of the valve opened indicator 430.

The 'failure to respond' warning signal FTR on line 454 and the 'loss of power' warning signal LOP on line 452 are both connected to the input of OR logical operator 440. The output of the OR logical operator 440 is connected to the input of OR logical operator 434 along line 438 and to a flasher unit 456 which, when actuated, provides a periodically interrupted output signal through complementary operator 436 to AND logical operator 432 and the indicator 430. The 'loss of power' warning signal LOP on line 452 is connected directly to a flasher unit 458 which, when actuated, provides a periodically interrupted output signal through complementing operator 450 to the AND logical operator 446 and the indicator 444.

A 'computer alarm' indication DAS is provided along line 460 from the output of an OR logical operator 462 which provides the inclusive OR result of the 'loss of power' warning signal LOP from line 452, the 'failure to respond' warning signal FTR from line 454, and a 'loss of continuity' warning signal LOC from line 472.

Figure 6:
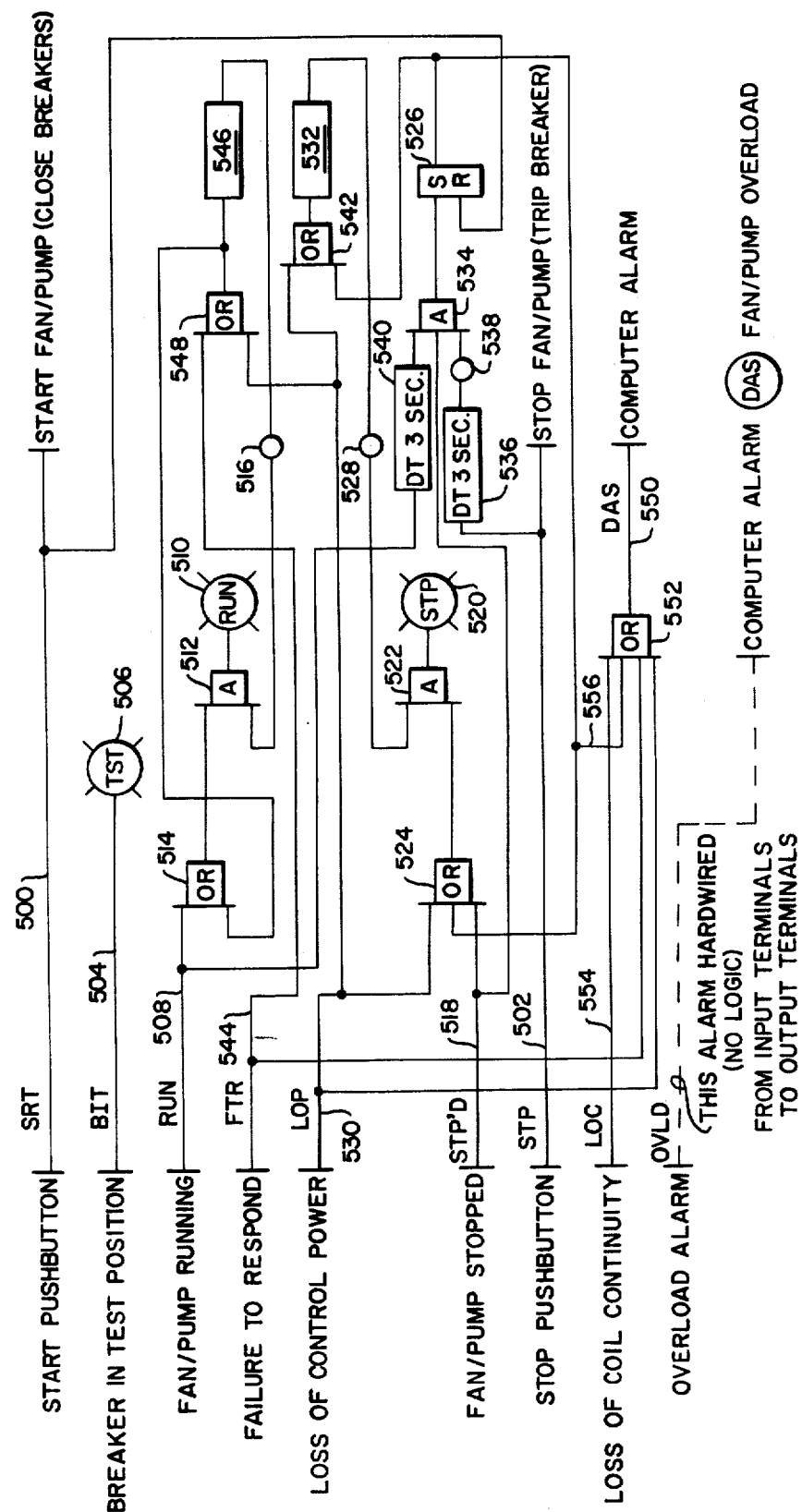
FIG. 6 is a logic diagram representing the logic control functions and command sequences for an electrically operated breaker.

FIG. 6 illustrates a logic diagram for an electrically operated breaker in which the controlled device is energized by closing the breaker and de-energized by tripping the breaker open.

The 'start device' command signal SRT and the 'stop device' input signals for closing and tripping open the breaker are provided directly on lines 500 and 502. A 'breaker-in test' indication signal BIT is provided on line 504 to an indicator 506.

A 'device is running' indication signal RUN is provided on line 508 and is used to actuate an indicator 510 through an AND logical operator 512 and an OR logical operator 514. The indicator 510 receives its signal from the AND logical operator 512 when coincidence occurs between the output of the OR logical operator 514 and the complement of the inclusive OR result of the 'failure to respond' warning signal FTR and the 'loss of power' warning signal LOP provided through complementing operator 516. The OR logical operator 514 receives the 'device is running' indication signal RUN on line 508 and the inclusive OR output of OR logical operator 548.

A 'device is stopped' indication signal STP'D is provided on line 518 and is used to actuate an indicator 520 through an AND logical operator 522 and an OR logical operator 524. The indicator 520 receives its signal from the AND logical operator 522 when coincidence occurs between the output of the OR logical operator 524 and the complement of the inclusive OR result of the 'loss of power' warning signal LOP and the S output of an RS latch 526 provided through complementing operator 528. The OR logical operator 524 provides the inclusive OR result of the 'device is stopped' indication signal STP'D on line 518, the 'loss of power' warning signal LOP from line 530, and the S output of the RS latch 526.

The RS latch 526, in cooperation with an AND logical operator 534, is adapted to provide a warning indication signal if the controlled device, after being commanded to start, enters an uncommanded stop condition any time after the expiration of a three-second time delay period. The RS latch 526 has its S input connected directly to the output of the AND logical operator 534 and its R input connected directly to the 'start device' input line 500. The inputs of the AND logical operator 534 are connected to the 'device is running' line 508 through a three-second time delay gate 540, directly to the 'device is stopped' line 518, and to the 'stop device' input line 502 through a three-second time delay gate 536 and a complementing operator 538. When a 'start device' input signal SRT is provided on line 500, the RS latch 526 is reset. The time delay gates 540 and 536 then delay, respectively, the 'device is running' indication signal RUN and the 'stop device' command signal STP for a three-second period. At the the expiration of this time period, these two signals are applied to the AND logical operator 534 by the respective time delay gates. If the controlled device is running, the absence of the 'device is stopped' indication signal STP'D prevents the AND logical operator 534 from providing an output to set the RS latch 526. Should the device enter an uncommanded stop condition, e.g., because of a controlled device malfunction, the presence of the 'device is stopped' indication signal STP'D, the presence of the complement of the 'stop device' input signal STP (which indicates that the device has not been commanded to stop), and the presence of the 'device is running' indication signal RUN (which will continued to be applied to the AND logical operator 534 for a three-second period by the time delay gate 540) will cause the AND logical operator 534 to set the RS latch 526 which then provides a warning indication signal through an OR logical operator 542, a flasher unit 532, a complementing operator 528, and an AND logical operator 552, described below.

The 'failure to respond' warning signal FTR on line 544 and the 'loss of power' warning signal LOP on line 530 are both connected to the input of OR logical operator 548. The output of the OR logical operator 548 is connected to the input of OR logical operator 514 and to the flasher unit 546 which, when actuated, provides a periodically interrupted output signal through complementary operator 516 to the AND logical operator 512 and the indicator 510. The 'loss of power' warning signal LOP on line 530 is connected through the OR gate 542 to the flasher unit 532 which, when actuated, provides a periodically interrupted output signal through complementing operator 528 to the AND logical operator 522 and the indicator 520.

A 'computer alarm' indication signal DAS is provided along line 550 from the output of the OR logical operator 552 which provides the inclusive OR results of a 'loss of continuity' warning signal LOC provided on line 554, the S output of the RS latch 526 provided on line 556, the 'failure to respond' warning signal FTR provided on line 544, and the 'loss of power' warning signal LOP provided from line 530.

Figure 7:
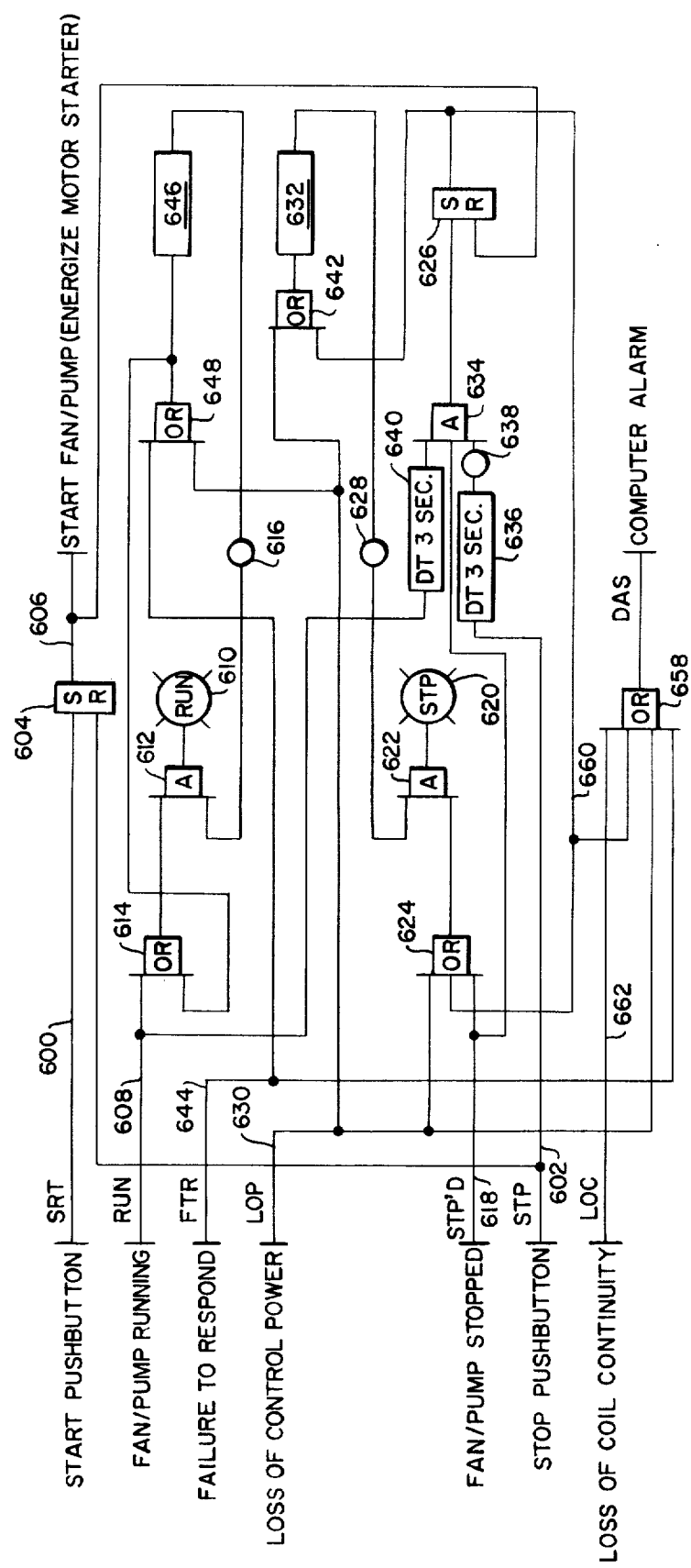
FIG. 7 is a logic diagram representing the logic control functions and command sequence for a motor starter.

FIG. 7 illustrates the logic diagram for a motor starter for starting a motor driven device such as a fan, pump, or the like in which the device is started when the motor starter is energized.

The 'start' input signal SRT for energizing the motor starter and the 'stop' input signal STP for de-energizing the motor starter to stop the controlled device are provided, respectively, on lines 600 and 602 with these two commands being directed to the S and R inputs of an RS latch 604 which provides the output command signal to the motor starter on line 606.

A 'device is running' indication signal RUN is provided on line 608 and is used to actuate an indicator 610 through an AND logical operator 612 and an OR logical operator 614. The indicator 610 receives its actuation signal from the AND logical operator 612 when coincidence occurs between the output of the OR logical operator 614 and the complement of the inclusive OR result of a 'failure to respond' warning signal FTR and the 'loss of power' warning signal LOP provided through complementing operator 616.

A 'device is stopped' indication signal STP'D is provided on line 618 and used to actuate an indicator 620 through an AND logical operator 622 and an OR logical operator 624. The indicator 620 receives its signal from the AND logical operator 622 when coincidence occurs between the output of the OR logical operator 624 and the complement of the inclusive OR result of the 'loss of power' warning signal LOP and the S output of an RS latch 626 provided through a complementing operator 628. The OR logical operator 624 provides the inclusive OR result of the 'device is stopped' indication signal on line 618, the 'loss of power' warning signal LOP from line 630, and the S output of the RS latch 626.

The RS latch 626, in cooperation with an AND logical operator 634, is adapted to provide a warning indication signal if the controlled device, after being commanded to start, enters an uncommanded stop condition any time after the expiration of a three-second time delay period. The RS latch 626 has its S input connected directly to the output of the AND logical operator 634 and its R input connected directly to the 'start' output line 606. The inputs of the AND logical operator 634 are connected to the 'device is running' line 608 through a three-second time delay gate 640, directly to the 'device is stopped' line 618, and to the 'stop device' input line 602 through a three-second time delay gate 636 and a complementing operator 638. When a 'start device' input signal SRT is provided on line 600, the RS latch 626 is reset. The time delay gates 640 and 636 then delay, respectively, the 'device is running' indication signal RUN and the 'stop device' command signal STP for a three-second period. At the expiration of this time period, these two signals are applied to the AND logical operator 634 by the respective time delay gates. If the controlled device is running, the absence of the 'device is stopped' indication signal STP'D prevents the AND logical operator 634 from providing an output to set the RS latch 626. Should the device enter an uncommanded stop condition, e.g., because of a controlled device malfunction, the presence of the 'device is stopped' indication signal STP'D, the presence of the complement of the 'stop device' input signal STP (which indicates that the device has not been commanded to stop), and the presence of the 'device is running' indication signal RUN (which will continue to be applied to the AND logical operator 634 for a three-second period by the time delay gate 640) will cause the AND logical operator 634 to set the RS latch 626 which then provides a warning indication signal through an OR logical operator 642, a flasher unit 632, the complementing operator 628, and the AND logical operator 622 to the indicator 620 and a warning indication to an OR logical operator 658.

The 'failure to respond' warning signal FTR on line 644 and the 'loss of power' warning signal LOP on line 630 are both connected to the input of OR logical operator 648. The output of the OR logical operator 648 is connected to an input of OR logical 614 and to the flasher unit 646 which, when actuated, provides a periodically interrupted output signal through complementing operator 616 to AND logical operator 612 and the indicator 610. The 'loss of power' warning signal LOP on line 630 is connected through OR logical operator 642 to a flasher unit 632 which, when actuated, provides a periodically interrupted output signal through complementing operator 628 to the AND logical operator 622 and the indicator 620.

A computer alarm signal DAS is provided at the output of the OR logical operator 658 which provides the inclusive OR result of the 'failure to respond' warning signal FTR from line 644, the 'loss of power' warning signal LOP provided from line 630, the S output of the RS latch 626 provided on line 660, and a 'loss of continuity' warning signal LOC provided on line 662.

Figure 8A:
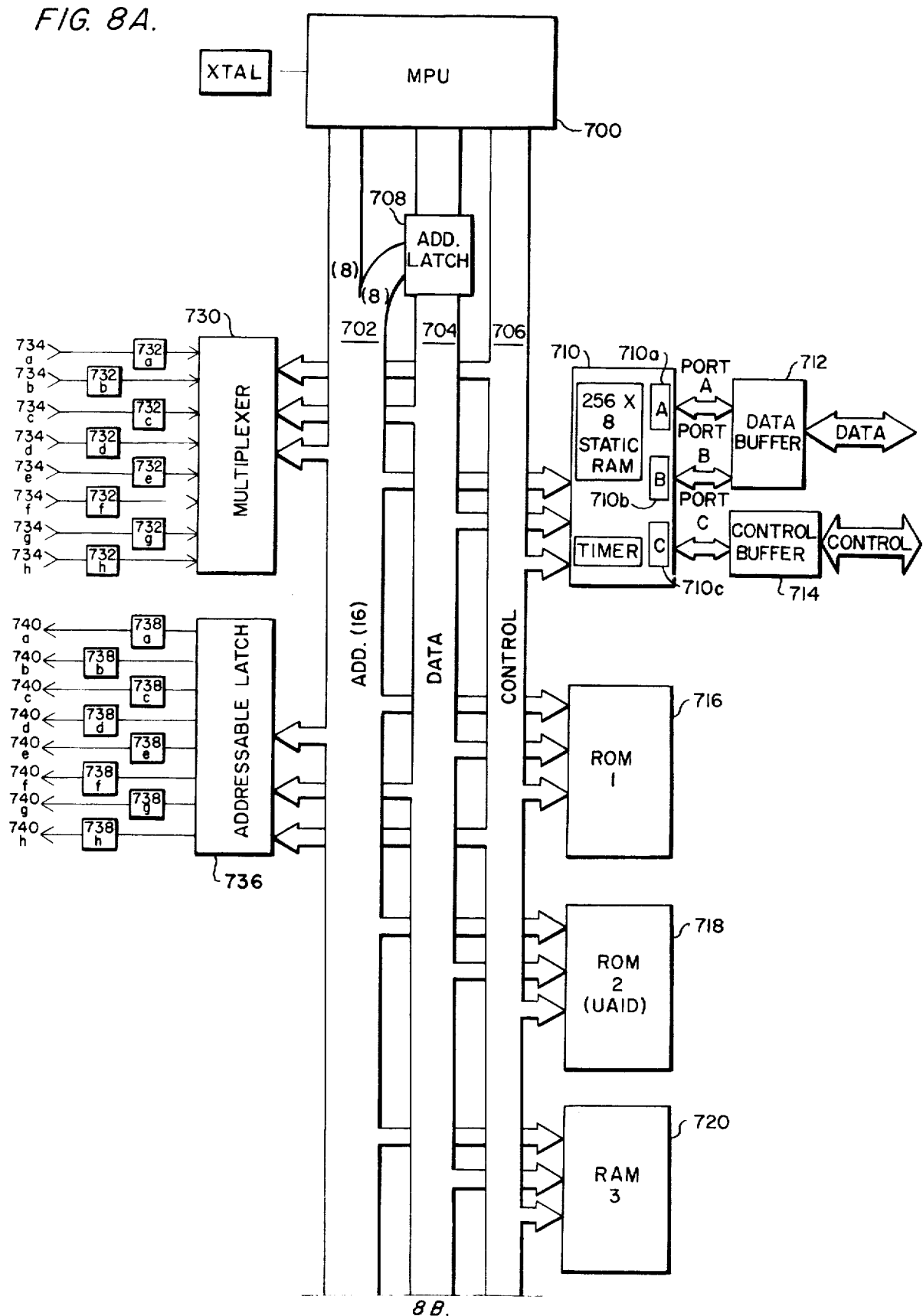
FIGS. 8A and 8B illustrate, in schematic form, the architecture of a single board computer suitable for use in accordance with the present invention.
Figure 8B:
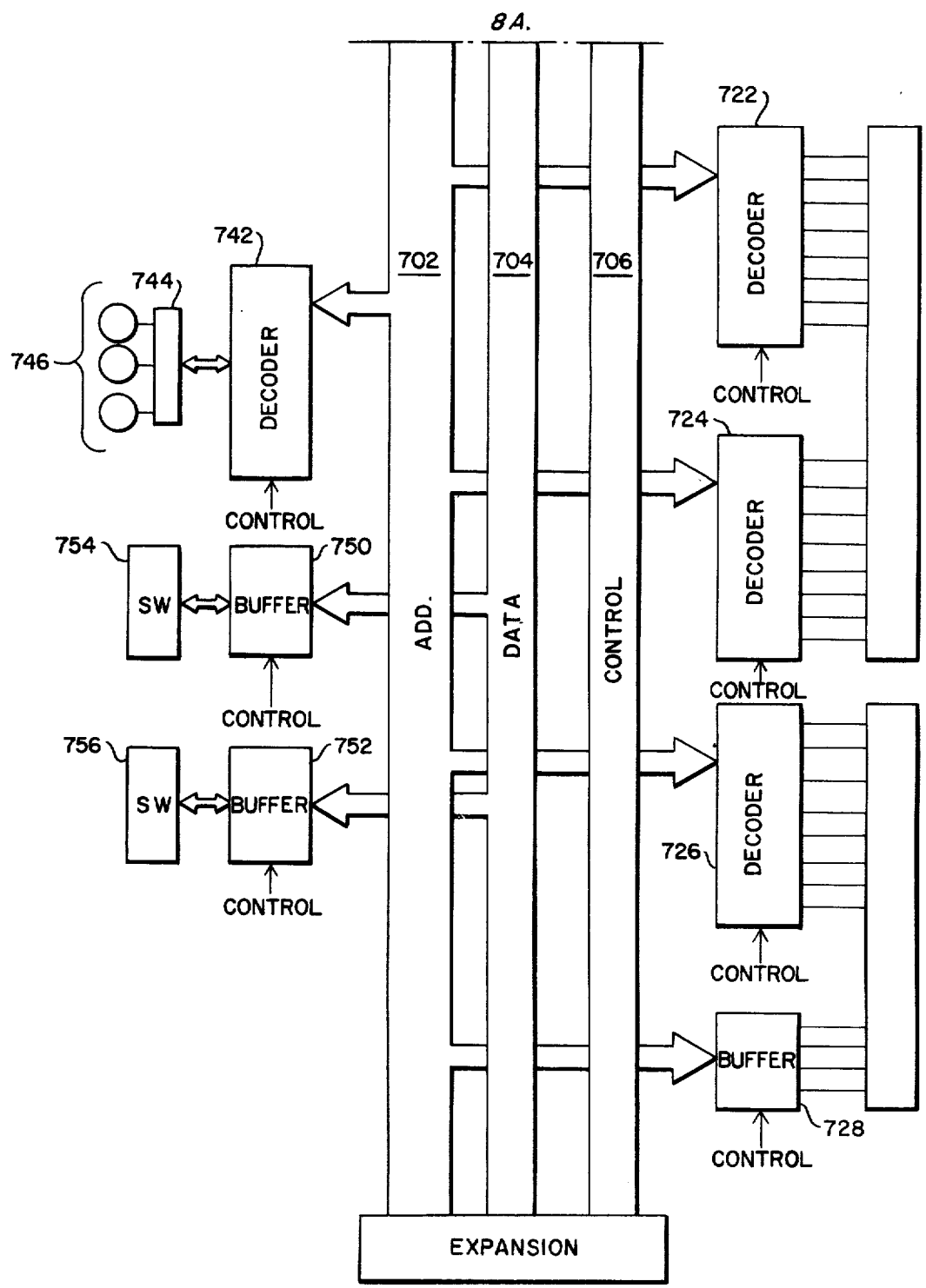

The overall organization of a single board computer suitable for use in accordance with the present invention is shown in FIGS. 8A and 8B. The particular computer illustrated is based on the Intel 8085 Microprocessor and its associated support IC's (integrated circuits) which provide a general purpose programmable computer. This processor, as is common with other general purpose MPU's, includes an arithmetic logic unit, an accumulator, flag storage register, program counter, stack pointer, and a plurality of user-accessible operating registers (B,C,D,E,H, and L); and is operable in various addressing modes including immediate, direct, indirect, and relative addressing modes. It is understood that the computer organization illustrated in FIGS. 8A and 8B is merely exemplary or representaive of a large number of microprocessor-based single board computers that are suitable for use in accordance with the present invention and that the organization is schematic or representational in form, the actual interconnections and functional/control signal relationships of the various inegrated circuits being known in the art as explained, e.g., in An Introduction to Microprocessors by Osborne, A. et al (Berkely, Cal., 1977) Vol. II, pp. 5-1 to 5-75; and the MSC-85 User's Manual published by the Intel Corporation, Santa Clara, California.

The microprocessor 700 is an 8-bit general purpose processor (Intel 8085) that provides a 16-bit address buss 702, an 8-bit data buss 704, and a control buss 706. The upper 8 bits of the address buss 702 are provided directly from the processor and the lower 8 bits are multiplexed from the data buss through a latch 708 (Intel 8212). The control buss 706 provides the interconnections between the processor 700 and the various support integrated circuits (IC's) on the computer board as well as the inter-IC control signal interconnections. The control signals include, e.g., read/write, address latch, interrupt, hold, clear, inhibit/enable, clock, and reset control signals; and input, output and memory management signals. The various busses, or portions thereof, are connected to the remaining integrated circuits on the computer board to provide address, data, and control signals thereto. The computer is interfaced with the inter-communication busses through a user configurable programmable peripheral interface 710 (Intel PPI 8155) which provides 256 bytes of static RAM (random access memory), a real-time delay, and a plurality of input/output lines which are configured to provide an input port 710a and an output port 710b, both ports of which are connected to a bidirectional buffer 712, and a control port 710c that is connected to a control buffer 714. The processor 700 interconnects through the address, data, and control busses with 8-bit read only memories (ROM) 716 and 718 and a 1-bit random access memory (RAM) 720. In the preferred embodiment of the computer, the ROM's 716 and 718 are mounted in DIP (dual in-line package) sockets and preferably provide between 1K and 8K of memory, and the RAM 720 is hardwired in place and provides 1K of static memory.

The ROM 716 contains the monitor and master control program and the ROM 718, which functions as the user alterable interconnection devide (UAID), specifies the interconnection between selected portions of the master program and the controlled device. The RAM 720 functions as a general purpose storage register for miscellaneous 1-bit data developed by the master program in ROM 716.

The decoders 722 and 724 are each one-of-eight decoders connected to the address buss and adapted to partially decode the address. The decoder 722 decodes the available 64K addresses into eight 8K-blocks with the output of this decoder used to provide various circuit enable signals, and the decoder 724 decodes the uppermost 8K address blocks decoded by the decoder 722 into eight 1K-blocks with the output of this decoder used to provide various on-board circuit enable signals.

The decoder 726 is also a one-of-eight decoder that operates with an address buffer 728 to further decode a selected block of addresses to provide enable signals for various of the input/output cards I/O$_{1,2}$, ... I/O$_{n-1}$, I/O$_n$ existing within the system and various other on-board circuits.

An eight-to-one multiplexer 730 and associated buffers 732a, b, c ... h allows the processor 700 to determine the status of various 24 volt D.C. lines 734a,b,c, ... h. The multiplexer 730 is enabled by an appropriate chip select and gates a selected input to the data buss for evaluation by the processor 700. Another multiplexer 736 and associated buffers 738a,b,c, ... h allows the processor to provide a 24 volt D.C. output on selected lines 740a,b,c, ... h. As in the case of the multiplexer 730, the multiplexer 736 is enabled by an appropriate chip select signal and decodes a selected portion of the address buss to provide the 24 VDC output.

A decoder 742 and an associated latch 744 are provided to selectively enable a multi-LED display 746. The display is under software control and is used to provide an on-board indication of various control conditions or an indication of various program milestones. The decoder 742 also provides chip enable signals to two buffers 750 and 752 which are connected, respectively, to multi-digit DIP switches 754 and 756. These switches are user accessible and permit user selected information (e.g., time delay) to be utilized by the master program.

In addition to the structure described above, the single board computer includes power regulation, over-voltage and over-current protection; power-up and power-down sequence controls; various resets; connectors for effecting the interface of the computer with various busses and peripherial devices, including expansion devices; and structure for effecting data accuracy checks, e.g. complement error detection circuitry.

The computer is adapted to interface with a variety of input/output circuit boards I/O$_{1,2,3}$...I/O$_{n-1}$, I/O$_n$, each of which is designed to provide a particular set of control voltages and currents to various of the controlled devices. While these input/output boards are not specifically illustrated, representative input/output boards in accordance with the preferred embodiment include 8 channel multi-voltage (24 VDC, 48 DVC, 125 VDC, 120 VAC) cards; 8 channel 120 VAC cards; 8 channel 125 VDC cards, 8 channel lamp driver cards; 8 channel relay contact cards; various single and dual coil 120 VAC and 125 VDC drivers; and various serial and parallel data converters.

Figure 9:
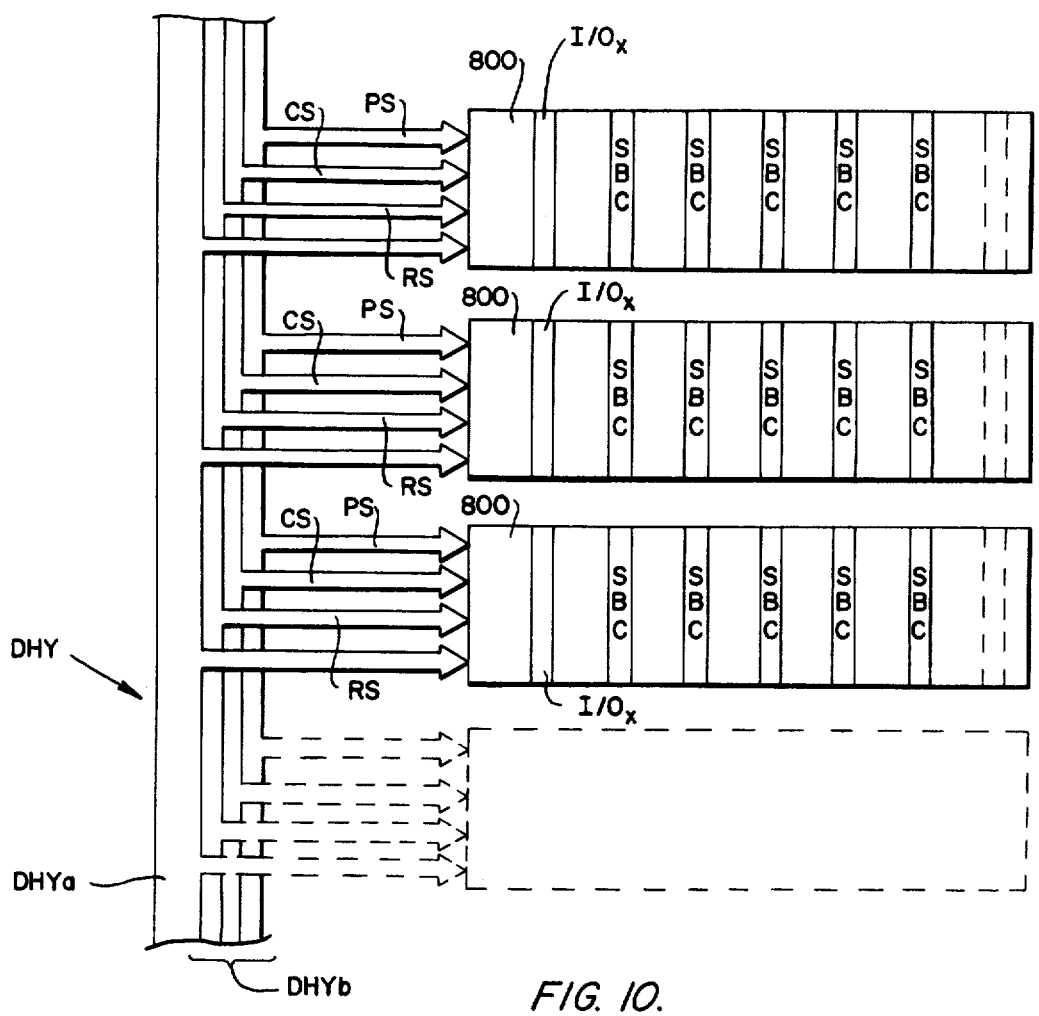
FIG. 9 represents the preferred physical arrangement of the single board computers of an industrial control system in accordance with the present invention.

The central, supervisory computer SC is connected to each single board computer SBC via the intercommunication buss DHY which includes (FIG. 9) an information or data portion DHY$_a$ and address portion DHY$_b$ that is used by the supervisory computer SC to sequentially address or poll each single board computer SBC in the system. As the supervisory computer SC polls each single board computer SBC, it monitors for malfunction and alarm indications at each polled computer and, in addition, can request information and data for record keeping purposes. In the preferred form, as shown in FIG. 9, the single board computers SBC$_1$, $_2$, ... $_n$ are mounted in conventional racks (not shown) with each rack containing a motherboard 800 that is designed to accommodate a predetermined number of single board computers SBC. Each rack also includes a signal expansion/buffer board I/O$_x$ that is used by the supervisory computer to assist in selecting a particular single board computer SBC.

The address portion of the intercommunication buss DHY is divided into three sub-busses, a rack select subbuss RS, a card select sub-buss CS, and a point select subbuss PS, that are connected to both the signal expansion/buffer board I/O$_x$ and the motherboard 800 of each rack. The rack select sub-buss RS is an eight line buss that provides a one-of-eight output decoded from the supervisory computer address buss, and the card select sub-buss CS is a four-line buss that provides a one-of-four output decided from the supervisory computer address buss. The point select sub-buss PS is a three-line uncoded binary output, also from the supervisory computer.

Figure 10:
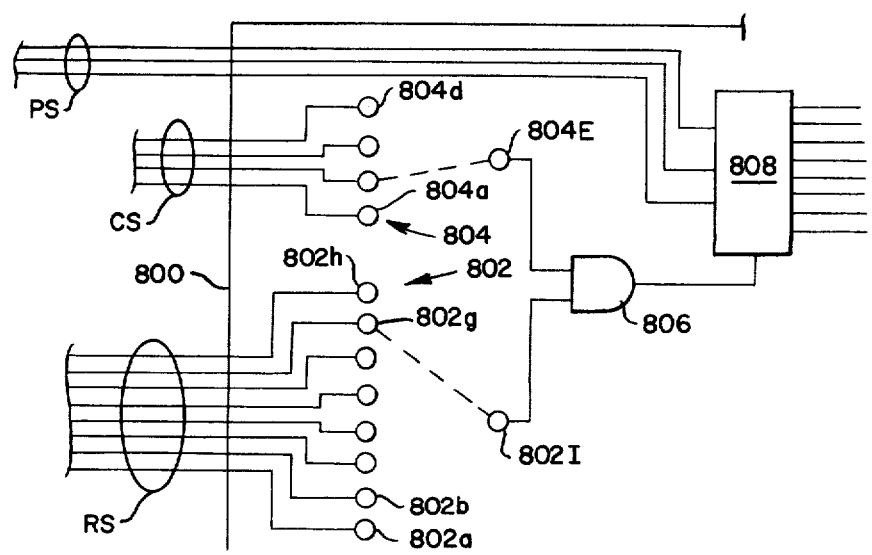
FIG. 10 represents a preferred addressing arrangement whereby a selected one of single board computers, arranged in accordance with the illustration of FIG. 9, is addressed by a supervisory computer.

As shown in FIG. 10, the rack select and card select sub-busses, RS and CS, are each connected, respectively, to "jumper pad" type terminations 802 and 804 located on the motherboard or, if preferred, another specially provided printed circuit board (not shown). The eight rack select lines each terminate at a pin 802$_a$, $_b$, $_c$ and $_d$. A pin 802$_J$, located adjacent the pins 802$_{a,b}$, ... $_h$ and another point 804$_E$, located adjacent the pins 804$_{a,b,c}$, and $_d$, are provided to permit a hard-wire jumper (broken-line illustration) to be connected between a selected line of the rack select sub-buss RS and the pin 802$_J$ and another jumper (also shown in broken-line illustration) to be connected between the pin 804$_E$ and a selected line of the card select sub-buss CS. The pins 802$_J$ and 804$_E$ are connected to the inputs of an AND gate 806 which provides an enable output when coincidenc occurs between the jumperselected rack select line and the jumper-selected card select line.

The point select sub-buss PS is connected to an eight-to-one decoder 808 which is located on the signal expansion/buffer board I/O$_x$ and receives it enable signal from the AND gate 806. When the jumper selected lines of the rack select and the card select sub-busses, RS and CS, go to a predetermined logic state (e.g., binary high or binary low), the decoder 808 is enabled to select a particular output line as determined by the point select sub-buss PS. These output lines are, in turn, connected to the single board computers located in the selected rack and function to enable the single board computer addressed by the supervisory computer SC. As can be appreciated, the circuitry of FIG. 10 enables the central, supervisory computer SC to select one of several hundred single board computers.

A demonstration master program for use with the single board computer described above and which includes instruction sequences that correspond to the logic control functions and command sequences of the controllers illustrated in FIGS. 2-7 is provided in the attached Appendix under listings 1, 2A, 2B, and 2C; and UAID contents that correspond to the controllers illustrated in FIGS. 2-7 are listed under listings 3A, 3B, 3C, and 3D. The various program statements are written in 8085 assembly-level language as described in, e.g., the 8080/8085 Assembly Language Program Manual (1977) published by the Intel Corporation, Santa Clara, Calif.

Listing 1 is the monitor program that functions on cold start to condition the microprocessor and the associated integrated circuits to function in response to the program listings in listing 2A, 2B and 2C and to provide the intercommunication buss service routine. The monitor program, a detailed understanding of which is not necessary to an understanding of the present invention, establishes the stack; the interrupt handling procedures; preconditions various registers including the various flag registers and the direction control registers of the programmable peripheral interface; resets or sets the various latches, timers, buffers, and other circuits; and preloads various registers or latches with selected binary information. The function of the monitor is discussed, e.g., in the SKD-85 System Design User Manual (1977) pp. 6-1 et seq. published by the Intel Corporation, Santa Clara, California.

Listings 2A, 2B, and 2C are the 'master' program which interacts with the UAID address locations to effect control and monitoring of the controlled devices. Listing 2A, from program sequences 29-133, provides the program steps necessary to perform the malfunction and alarm monitoring of each control device; program listing 2B, from program sequences 139-232, includes the program steps necessary to effect actual control of the controlled devices in combination with the contents of the UAID, and listing 2C includes the various sub-routines called for by the program listings 2A and 2B including a multiply, a time delay, a flasher control, and a flip-flop sub-routine.

An appreciation of the present invention may be best obtained by consideration of the 'actual control' portion of the master program, that is, listing 2B (program sequence 139-232), which contains the program steps necessary to effect the logic control functions and/or command sequences for all the controlled devices of FIGS. 2-7. The master program is designed to address a block of addresses prereserved for the UAID, namely addresses 2000-204A (Hex). Of these addresses, locations 2000-2026$_H$ are reserved for the 'malfunction/alarm program' listing 2A, and addresses 2028-204A$_H$ are reserved for the 'actual control program' listing 2B.

In FIG. 11, the first 12 program sequence steps for the 'actual control program' portion of the master program, that is, listing 2B, have been reproduced along with the corresponding UAID address locations and UAID location contents associated with these 12 steps for the relatively sophisticated electrically operated breaker of FIG. 6 and the simpler solenoid operated valve of FIG. 2.

During program sequences 139-140, the processor 700 (FIG. 8), operating in an indirect addressing mode, accesses address 2028 of UAID 718 (which is predesignated asI/O input #14) and transfers the binary information, e.g., 00000001) from the I/O port designaed in that location to the processor B register, and during program sequences 141 and 142, the processor 700 access address 2038 of the UAID 718 (which is predesignated as I/O output #1C) and copies the binary information contained in its B register to the I/O port designated in this latter UAID location. For an UAID 718 configured for an electrically operated breaker, as illustrated in FIG. 11, the address 2028 directs the processor to I/O port locations E010, which is the start switch input port, and the address 2038 directs the processor to I/O location E039, which is the start command signal output port. Thus, as a single board computer adapted to control an electrically operated breaker sequences through steps 139 through 142, binary information which can represent the 'start device' input signal is transferred from the appropriate input port to the appropriate output port to effect device starting.

During program sequences 143 and 144, the processor 700 accesses address 202A of the UAID 718 (I/O input #15) and copies the binary information from the I/O port designated therein to the processor C register, and during program sequences 145 and 146, the processor accesses address 203A of the UAID 718 (I/O output #1D) and copies the binary information from the C register to the I/O port designated in this latter UAID location. For a UAID configured for the electrically operated breaker, as shown in FIG. 11, the address 202A directs the processor to I/O location E011, which is the stop switch input port, and the address 203A directs the processor to I/O location E038, which is the stop command signal output port. As a single board computer adapted to control an electrically operated breaker sequences through program sequences 143 to 146, a binary word that can represent the 'stop device' input signal is transferred from the appropriate input port to the output port to effect device stopping.

During program sequences 147 and 148, the processor 700 accesses address 202C of the UAID 718 (I/O input #16) and copies the binary information from the I/O port designated in this location into the processor A register (the accummulator), and during program sequences 149 and 150, the processor accesses UAID address 203C (I/O output #1E) and copies the binary information from the processor A register to the I/O port designated in this latter UAID address. For a UAID configured for an electrically operated breaker, the address 202C directs the processor to I/O location E03C, which is the 'breaker in test position' input indication signal, and the UAID address 203C directs the processor to I/O output location E01A which is the output port for the 'breaker in test position' indicating lamp. As a single board computer adapted to control an electrically operated breaker sequences through program steps 147 to 150, the appropriate 'breaker in test position' input signal is transferred from the input port to the appropriate output port to provide the output indication signal.

The UAID 718 contents for a solenoid operated valve for program sequences 139 to 150, as also shown in FIG. 11, are different from that for the UAID location contents for the electrically operated breaker as discussed above. For the solenoid operated valve, only UAID locations 2028 and 202A contain actual I/O port addresses while the remaining UAID addresses for the solenoid operated valve, that is, addresses 2038, 203A, and 202C and 203C contain spare address information (FFFF). The spare address information is chosen so that the logic control functions and/or command sequences of the master program in the ROM 716 (FIG. 8) that do not correspond to the solenoid operated valve are not effective to provide control over the controlled device as a result of the so-chosen spare address information.

The difference between the UAID 718 contents for the electrically operated breaker (FIG. 6) and solenoid operated valve (FIG. 2), which difference is illustrated in FIG. 11 and in the comprehensive listings 3A and 3B, arise from the differences in the logic control functions and/or command sequences of these two controlled devices. For example, the close and open lines 100 and 102 of the solenoid operated valve (FIG. 2) are connected to and function through an RS latch 104, while the electrically operated breaker (FIG. 6) does not require an RS latch function. Consequently, the UAID 718 contents for an electrically operated breaker allow program sequences 139 to 146 to move start or stop conmands directly from the appropriate input port (that is, I/O input port addresses E010 and E011) to the appropriate output port (that is, I/O output port addresses E039 and E038), while the UAID 718 contents for a solenoid operated valve cause program sequences 139 to 146 to hold the start or stop commands until an RS latch subroutine is called up. Likewise, the electrically operated breaker of FIG. 9 includes a 'breaker in test position' input 504 and an associated indicator 506 while the solenoid operated valve of FIG. 2 does not include a similar logic function. Consequently, a UAID configured for an electrically operated breaker would include in the UAID addresses 202C and 203C the input and output address information for the 'breaker in test position' indication signal BIT (that is, I/O port address E03C) and the indicator 506 (that is, I/O port E01A) while the same UAID locations in a UAID configured for a solenoid operated valve would contain the spare address information FFFF.

A complete listing of the UAID contents for the 'malfunction/alarm' listing 2A and for the 'actual control' listing 2B for the various controlled devices of FIGS. 2–7 are provided under listings 3A, 3B, 3C and 3D.

As can be readily appreciated, the present invention permits a single master program, containing the logic control functions and command sequences for an entire system, to be readily adapted to a particular one of a plurality of diverse control devices which exist within the system. This aspect of the invention is particularly significant since it is possible for industrial control system personnel, who may be untrained in low-level assembly or machine-level languages and who may also be reluctant to learn such languages, to easily adapt a single board computer containing a master program to any one of the control devices within the system. When the master program is written, the inputs and outputs for the various logic control program are associated with and identified by assigned UAID addresses. To thereafter configure a single board computer containing the master program to a particular controlled device within the system, the I/O port addresses of the particular device that provide the inputs and outputs for the device's logic control function and/or command sequences are loaded into the UAID addresses that correspond to the desired logic control function and/or command sequence portion(s) of the master program. The remaining UAID addresses, which provide the inputs and outputs for the logic control functions and/or command sequences of the master program that do not correspond to logic control and/or command sequences of the controlled device, are loaded with spare or other nonoperaive addresses to prevent the noncorresponding program portions from effecting any control over the controlled device. Since the UAID takes the form of a programmable read only memory (PROM), the UAID may be quickly and conveniently configured with a field-portable PROM programmer.

As will be apparent to those skilled in the art, various changes and modifications may be made to the present invention without departing from the spirit and scope of the invention as recited in the appended claims and their legal equivalent.

APPENDIX

Listing 1

```
    LOC    OBJ      SEQ              SOURCE STATEMENT 1
                     2
                     3
                     4        NAME    FW1
                     5
                     6
                     7
                     8
                     9
                    10
    0005            11 NUMTD  EQU     5                , SET EQUAL TO ACTUAL NO. OF T.D.'S SYSTEM CAN
                    12                                 , HAVE **** MAX. NO. = 30 ****
    FC80            13 TOS    EQU     0FC80H           , SET TOP OF STACK EQUAL TO THIS VALUE
    FC81            14 ICIDSF EQU     0FS81H           , INTERCOM. PORT INPUT DATA STORAGE LOCATION FLAG
    E800            15 ICIDSL EQU     0E800H           , INTERCOM. PORT INPUT DATA STORAGE STARTING
                    16                                 , ADDRESS - (1 BIT RAM)
    0001            17 NUMIIB EQU     1                , SET EQUAL TO NO. OF 7 BIT BYTES OF INPUT DATA
                    18                                 , REQUIRED BY INTERCOM. BUSS
    FC82            19 ICODSF EQU     0FC82H           , INTERCOM. PORT OUTPUT DATA STORAGE LOCATION FLAG
    E807            20 ICODSL EQU     ICIDSL+(NUMIIB*7)    , INTERCOM. PORT OUTPUT STORAGE
                    21                                     , STARTING ADDRESS -(1 BIT RAM)
    0001            22 NUMIOB EQU     1                , SET EQUAL TO NO. OF 7 BIT BYTES OF OUTPUT DATA
                    23                                 , REQUIRED BY INTERCOM. BUSS
    E80E            24 SA1BDS EQU     ICODSL+(NUMIOB*7)
    0000            25        ORG     0000
    0000 F3         26        DI
    0001 3E00       27        MVI     A,00
    0003 217BE0     28        LXI     H, 0E07BH        ,TURN OFF FINAL 5VDC
    0006 77         29        MOV     M,A
    0007 23         30        INX     H
    0008 77         31        MOV     M, A             , RESET COMPLEMENT ERROR
    0009 23         32        INX     H
    000B 77         33        MOV     M, A
    000B 2100E8     34        MOV     H, 0E800H        , RESET I/O LATCHES
    000E 3E00       35 MEMRES: MVI    B,00
    0010 77         36        MOV     M, A
    0011 23         37        INX     H
    0012 7C         38        MOV     A,H              , FILL 8 BIT RAM WITH 00
```

```
LOC  OBJ        SEQ          SOURCE STATEMENT

0013 FEED       39                   CPI     0FDH
0015 C20E00     40                   JNZ     MEMRES
0018 3180FC     41                   LXL     SP, TOS
001B 3E80       42                   MVI     A, 80H           ,SET TOP OF STACK
001D D384       43                   OUT     84H              ,LOAD LOW ORDER BYTE OF TIMER
001F C34400     44                   JMP     PWRUP            ,JUMP TO POWERUP ROUTINE
                45
0024            46                   ORG     24H
                47
0024 C30000E    48   TRAP:           JMP     RTRAP            ,JUMP TO TRAP INTERRUPT ROUTINE
                49
002C            50                   ORG     2CH
                51
002C C36C00     52   RST55:          JMP     TIMER            ,JUMP TO TIMER SERVICE ROUTINE
                53
0034            54                   ORG     34H
                55
0034 C39600     56   RST65:          JMP     INTIN            ,JUMP TO INTERCOM. INPUT ROUTINE
                57
003C            58                   ORG     3CH
                59
003C C3E600     60   RST75:          JMP     INTOUT           ,JUMP TO INTERCOM OUTPUT ROUTINE
                61
0044            62                   ORG     44H
                63
0044 3EE5       64   PWRUP:          MVI     8,0E5H
0046 D385       65                   OUT     85H              ,LOAD HI ORDER BYTE OF TIMER
0048 3EFA       66                   MVI     A,0FAH           ,INITIALIZE 8155
004A D380       67                   OUT     80H
004C 3E10       68                   MVI     A,18H
004E 30         69                   SIM                      ,INITIALIZE 8085 INTERRUPTS
004F 1E03       70                   MVI     E,03
0051 2100FF     71   PWRDEL:         LXI     H,0FF00H
0054 2B         72   PWRDE1:         DCX     H
0055 7C         73                   MOV     A,H
0056 FE00       74                   CPI     00               ,POWER UP DELAY
0058 C25400     75                   JNZ     PWRDE1
005B 1D         76                   DCR     E
005C C25100     77                   JNZ     PWRDEL
005F 217BE0     78                   LXI     H,0E07BH
0062 3E01       79                   MVI     A,01
0064 77         80                   MOV     M,R              ,TURN ON FINAL 5VDC
0065 23         81                   INX     H
0066 23         82                   INX     H
0067 77         83                   MOV     M,A              ,RESET I/O LATCHES AGAIN
0068 FB         84                   EI
0069 C30000E 85 JMP                  PROG
                86   *****************************************************************
                87   *
                88   * TIME DELAY SERVICE INTERRUPT ROUTINE-                           *
                89   * TWO WORDS OF 8 BIT RAM IS DEDICATED TO EACH TIME DELAY          *
                90   * BIT 15 INDICATES IF T.D. IS TIMING-                             *
                91   * BIT 14 INDICATES IF T.D. HAS TIMED OUT-                         *
                92   * BITS 0 THRU 13 CONTAIN THE ACCUMULATED TIME OF THE T.D.         *
                93   *                                                                 *
                94   *****************************************************************
                95
006C F3         96   TIMER:          DI
006D D5         97                   PUSH    D
006E E5         98                   PUSH    H
006F F5         99                   PUSH    PSW
0070 1605       100                  MVI     D,NUMTD
0072 21FFFC     101                  LXI     H,0FCFFH         ,TOP OF MEM. (FIRST T.D.)
0075    5E      102  TIMER1:         MOV     E,M
0076 7B         103                  MOV     A,E
0077 E6CD       104                  ANI     0C0H             ,IS TIME DELAY INPUT ON AND TIME DELAY NOT TIMED OUT
0079 FE80       105                  CPI     80H
007B 2B         106                  DCX     H
007C C20900     107                  JNZ     TIMER 2          ,YES, THEN INCR. LOW ORDER BYTE OF TIMER
007F    7E      108                  MOV     A,M
0080 3C         109                  INR     A
0081 77         110                  MOV     M,A
0082 C28900 111 JNZ                  TIMER 2          ,AFTER INCR. LOW ORDER BYTE IS IT 0 - IF YES
0085 1C         112                  INR     E
0086 23         113                  INX     H                ,INCR. HIGH ORDER BYTE
0087 73         114                  MOV     M,E
0088 2B         115                  DCX     H
0089 2B         116  TIMER2:         DCX     H
008A 15         117                  DCR     D                ,IF THIS THE LAST TIME DELAY - IF NO REPEAT ABOVE
008B 7A         118                  MOV     A,D              ,PROGRAM FOR NEXT DELAY - IF YES RETURN, RESTORE
008C FE00       119                  CPI     00               ,REGISTERS AND RETURN
008E C27500     120                  JNZ     TIMER 1
0091 F1         121                  POP     PSW
0092 E1         122                  POP     H
0093 D1         123                  POP     D
0094 FB         124                  EI
0095 C9         125                  RET
                126
                127  *****************************************************************
                128  *
                129  * INTERCOMMUNICATIONS BUSS INPUT ROUTINE -                        *
                130  * DATA BYTE FORMAT - BIT 7 = 0 = COMMAND                          *
                131  *                    BIT 7 = 1 = DATA                             *
                132  *                    BITS 0 THRU 6 = COMMAND CODE                 *
                133  *     ---- IF BITS 0 THRU 6 = 0 THEN RESET DATA BYTE CTR.         *
                134  *                                                                 *
                135  *****************************************************************
                136
```

```
LOC  OBJ      SEQ           SOURCE STATEMENT

0096 F3       137 INTIN:    DI
0097 D5       138           PUSH    D
0098 E5       139           PUSH    H
0099 F5       140           PUSH    PSW
009A 2191FC   141           LXI     H,ICIDSF
009D DB81     142           IN      81H         ;READ DATA FROM INTERCOM PORT
009F B7       143           ORA     A
00A0 17       144           RAL
00A1 DAB200   145           JC      DATA
0084 FE00     146           CPI     00
0086 CAAD00   147           JZ      RESISTOR    ;IS DATA A RESET DATA BYTE CTR COMMAND
00A9 1F       148           RAR
00AA C30000E  149           JMP     CMDDEC      ;JUMP TO COMMAND DECODER -- WARNING: THIS ROUTINE
              150                               ;MUST RESTORE ALL REG. AND EI
00AD 3600     151 RESTOR:   MVI     M,00
00AF C3E100   152           JMP     EINTIN
00B2 1F       153 DATA:     RAR
00B3 57       154           MOV     D,A
00B4 3E01     155           MVI     A,NUMIIB
0036 FE01     156           CPI     01
00B8 2100E8   157           LXI     H,ICIDSL
00BB CAD400   158           JZ      DATA2
00BE E5       159           PUSH    H
00BF 2181FC   160           LXI     H,ICIDSF
00C2 34       161           INR     M
00C3 BE       162           CMP     M
00C4 DA0000   163           JC      IERROR      ;JUMP TO NO. OF DATA BYTES DISAGREEMENT ERROR ROUTINE
00C7 5E       164 DATAR:    MOV     E,M         ;RE-ENTRY FOR DATA BYTE ERROR ROUTINE
00C8 E1       165           POP     H
0009 1D       166 DATA1:    DCR     E
00CA CAD400   167           JZ      DATA2
00CD 7D       168           MOV     A,L
00CE C607     169           ADI     07
00D0     6F   170           MOV     L,A
0001 030900   171           JMP     DATA1
0004 1E07     172 DATA2:    MVI     E,07
0006 7A       173           MOV     A,D
0007 77       174 DATA3:    MOV     M,A
0008 1D       175           DCR     E
0009     0AE100 176         JZ      EINTIN
00DC 2C       177           INR     L
0000 0F       178           RRC
00DE C30700   179           JMP     DATA3
00E1 F1       180 EINTIN    POP     PSW
00E2 E1       181           POP     H
00E3 D1       182           POP     D
00E4 F8       183           EI
00E5 C9       184           RET
              185
              186 ********************************************************************
              187 *                                                                  *
              188 * INTERCOMMUNICATION BUSS OUTPUT SERVICE ROUTINE-                   *
              189 *                                                                  *
              190 ********************************************************************
              191
00E6 F3       192 INTOUT:   DI
00E7 D5       193           PUSH    D
00E8 E5       194           PUSH    H
00E9 F5       195           PUSH    PSW
00EA 2182FC   196           LXI     H,ICODSF
00ED 34       197           INR     M
00EE 3E01     198           MVI     A,NUMIOB
00F0 BE       199           CMP     M
00F1 DA1B01   200           JC      RESINT
00F4 5E       201           MOV     E,M
00F5 2107E8   202           LXI     H,ICODSL
00F8 1D       203 INTO1:    DCR     E
00F9 DA0301   204           JZ      INTO2
00FC 7D       205           MOV     A,L
00FD 0607     206           ADI     07
00FF 6F       207           MOV     L,A
0100 C3F800   208           JMP     INTO1
0103 1E07     209 INTO2:    MVI     E,07
0105 1600     210           MVI     D,00
0107 7E       211 INTO3:    MOV     A,M
0109 E601     212           ANI     01
010A B2       213           ORA     D
0109 0F       214           RRC
010C 57       215           MOV     D,A
010D 1D       216           DCR     E
010E CA1501   217           JZ      INTO4
0111 2C       218           INR     L
0112 C30701   219           JMP     INTO3
0115 0F       220 INTO4:    RRC
0116 F680     221           ORI     80H
0118 C31F01   222           JMP     EINTOU
011B 3600     223 RESINT:   MVI     M,00
011D 3E00     224           MVI     A,00
011F D382     225 EINTOU:   OUT     82H
0121 F1       226           POP     PSW
0122 E1       227           POP     H
0123 D1       228           POP     D
0124 FB       229           EI
0125 C9       230           RET
              231
              232           END
```

Listing 2A

```
LOC     OBJ         SEQ         SOURCE STATEMENT
                    1
                    2
                    3
                    4
                    5
                    6
                    7
                    8
                    9
                    10
                    11          NAME        MASTER PROGRAM
                    12          CSEG
                    13          EXTRN       SA1BDS,DATAR
                    14          PUBLIC PROG,CMDDEC,IERROR,RTRAP
                    15
                    16
                    17          SA1BDS = THE STRATING ADDRESS OF THE 1 BIT RAM USED AS
                    18                   INTERNAL STORAGE REGISTERS
                    19
                    20
2000                21 SAPPP    EQU         2000H           ,STARTING ADDRESS OF
                    22                                      ,PROM #2 (UAID)
2022                23 ATTDPS   EQU         SAPPP+2 11H     ,ADDRESS OF TRAVEL T.D. #3 PRESET
                    24
                    25          ************************************************************
                    26          * MALFUNCTION ALARM INDICATION PROGRAM PORTION             *
                    27          ************************************************************
                    28
0000 2A0020         29 PROG:    LHLD        SAPPP+2*1
0003 7B             30          MOV         A,M             ,I/O INPUT #0
0004 2A0220         31          LHLD        SAPPP+2*1
0007 46             32          MOV         B,M             ,I/O INPUT #1
0008 B0             33          ORA         B
0009 57             34          MOV         D,A
000A 2A0A20         35          LHLD        SAPPP+2+5
000D    7E          36          MOV         A,M             I/O INPUT #5
000E 2F             37          CMA
000F 4F             38          MOV         C,A
0010 B2             39          ORA         D
0011 57             40          MOV         D, A
0012 2A0420         41          LHLD        SAPPP+2*2
0015 7E             42          MOV         A,M             I/O INPUT #2
0016 B1             43          ORA         C
0017 21FFFC         44          LXI         H,0FCFFH        ,ADDRESS OF T.D. #1
001A CDC001C        45          CALL        TDINC           ,CALL T.D. INPUT CONTROL ROUTINE
001D CDD301C        46          CALL        FLASH           ,CALL FLASHER CONTROL ROUTINE
0020 A2             47          ANA         D
0021 EA1A20         48          LHLD        SAPPP+2*ODH
0024 77             49          MOV         M,A             ,I/O OUTPUT #D
0025 2A0820         50          LHLD        SAPPP+2*4
0028 7E             51          MOV         A,M             ,I/O INPUT #4
0029 2F             52          CMA
002A 21FDFC         53          LXI         H,0FCFDH        ,ADDRESS OF T.D. #2
002D CDC001C        54          CALL        TDINC
                    55
0030 2F             56          CMA
0031 2A0620         57          LHLD        SAPPP+2 3
0034 B6             58          ORA         M               ,I/O INPUT #3
0035 B7             59          MOV         D,A
0036 03             60          PUSH        D
0037 21FBFC         61          LXI         H,0FCFBH        ,ADDRESS OF T.D. #3
0038 112320         62          LXI         D,ATTOPS        ,ADDRESS OF T.D. #3 PRESET VALUE
0039 007F01C        63          CALL        TOOUTC          ,CALL T.D. OUTPUT CONTROL ROUTINE
0040 B1             64          ORA         C
0041 31F9FD         65          LXI         H,0FDF9H        ,ADDRESS OF T.D. #4
0044 000001C        66          CALL        TDINC           TDINC
0047 D1             67          POP         D
0048 B2             68          ORA         D
0049 57             69          MOV         D,A
004A 0DD301C        70          CALL        FLASHC
004D A2             71          ANA         D
004E 2A1020         72          LHLD        SAPPP+2*0EH
0051 77             73          MOV         M,A             ,I/O OUTPUT #E
0052 2A0C20         74          LHLD        SAPPP+2*6
0055 56             75          MOV         D,M             ,I/O INPUT #6
0056 2A0820         76          LHLD        SAPPP+2*4
0059 7E             77          MOV         A,M             ,I/O INPUT #4
005A 2A0E20         78          LHLD        SAPPP+2*7
005D 3E             79          MOV         E, M            ,I/O INPUT #7
005E B3             80          ORA         E
005F 210000E        81          LXI         H,SA1BDS        ,ADDRESS OF INT. STOR. REG. #0
0062 CDF501C        82          CALL        PLFLPC          ,CALL FLIP-FLOP CONTROL ROUTINE
0065 7A             83          MOV         A,D
                    84
0066 80             85          ORA         B
0067 33             86          MOV         D,E
0068 210100E        87          LXI         H,SA1BDS+1      ,ADDRESS OF INT. STOR. REG. #1
006B 00F501 C       88          CALL        FLFLPC          ,CALL FLIP-FLOP CONTROL ROUTINE
006E 7E             89          MOV         A,M
006F 210000 E       90          LXI         H,SA1BDS
0072 B6             91          ORA         M
0073 21FEFC         92          LXI         H,0FCFBH        ,ADDRESS OF T.D. #3
0076 CDC001C        93          CALL        TDINC
0079 2A1020         94          LHLD        SAPPP+2*+8
007C 7E             95          MOV         A,M             ,I/O INPUT #8
```

```
LOC  OBJ        SEQ          SOURCE STATEMENT 007D 2F         96           CMA
007E 01F7FD     97           LXI     H,0FDF7H       ,ADDRESS OF T.D. #5
0081 CD1101 C   98           CALL    TDINC
0084 11  23     99           LXI     D,SAPPP+2*13H  ,ADDRESS OF T.D. #5 PRESET VALUE
0087 CD7F01    100           CALL    TDOUTC
008A A0        101           ANA     B
008B 47        102           MOV     B,A
008C 21FDFC    103           LXI     H,0FCFDH       ,ADDRESS OF T.D. #2
008F 112420    104           LXI     D,SAPPP+2*12H  ,ADDRESS OF T.D. #2 PRESET VALUE
0092 CD7F01    105           CALL    TDOUTC
0095 A0        106           ANA     B
0096 57        107           MOV     D,A
0097 2A1820    108           LHLD    SAPPP+2*0CH
009A 7E        109           MOV     A,M            ,I/O INPUT #C
009B 210200    110           LXI     H,SA1BDS+2     ,ADDRESS OF INT. STOR. REG. #2
009E CDF501    111           CALL    FLFLPC
00A1 7E        112           MOV     A,M
00A2 2A1E20    113           LHLD    SAPPP+2*0FH
00A5 77        114           MOV     M,A            ,I/O INPUT #F
00A6 221420    115           LHLD    SAPPP+2+0AH
00A9 7E        116           A,M                    ,I/O INPUT #A
00AA 2A1620    117           LHLD    SAPPP+2+00H
00AD 86        118           ORA     M              ,I/O INPUT #B
00AE 2F        119           CMA
00AF 81        120           ORA     C
00B0 2A1230    121           LHLD    SAPPP+2*9
00B3 B6        122           ORA     M              ,I/O INPUT #9
00B4 47        123           MOV     B,A
00B5 11FBFC    124           LXI     H,0FCFBH       ,ADDRESS OF T.D. #3
00B8 7E        125           MOV     A,M
00B9 FECD      126           CPI     0C0H
00BB D20300 C  127           JNC     TD3TO
0BBE 3E02      128           MVI     A,02
00C0 C34500 C  129           JMP     TD3CON
00C3 3E01      130 TD3TO:    MVI     A,01
```

Listing 2B

```
LOC OBJ         SEQ          SOURCE STATEMENT

00C5 60        131 TD3CON:   ORA     B
00C6 2AE020    132           LHLD    SAPPP+2*10H
00C9 77        133           MOV     M,A            ,I/O OUTPUT #10
               134
               135           **********************************************
               136           *   ACTUAL CONTROL PROGRAM PORTION           *
               137           **********************************************
               138
00CA 2A2820    139           LHLD    SAPPP+2*14H
00CD 46        140           MOV     B,M            ,I/O INPUT #14
00CE 2A3820    141           LHLD    SAPPP+2*1CH
00D1 70        142           MOV     M,B            ,I/O OUTPUT #1C
00D2 2A2A20    143           LHLD    SAPPP+2*15H
00D5 4E        144           MOV     C,M            ,I/O INPUT #15
00D6 2A3A20    145           LHLD    SAPPP+2+1DH
00D9 71        146           MOV     M,C            ,I/O OUTPUT #1D
00DA 2A2C20    147           LHLD    SAPPP+2*16H
00DD 7E        148           MOV     A,M            ,I/O INPUT #16
00DE 2A3C20    149           LHLD    SAPPP+2*1EH
00E1 77        150           MOV     M,A            ,I/O OUTPUT #1E
00E2 78        151           MOV     A,B
00E3 B1        152           ORA     C
00E4 2A3420    153           LHLD    SAPPP+2*1BH
00E7 56        154           MOV     D,M            ,I/O INPUT #1B
00E8 210300 E  155           LXI     H,SA1BDS+3     ,ADDRESS OF INT. STOR. REG. #3
00EB CDF501 C  156           CALL    FLFLPC
00EE 2A2820    157           LHLD    SAPPP+2*17H
00F1 56        158           MOV     D,M            ,I/O INPUT #17
00F2 2A3020    159           LHLD    SAPPP+2*18H
00F5 7E        160           MOV     A,M            ,I/O INPUT #18
00F6 2F        161           CMA
00F7 A2        162           ORA     D
00F8 5F        163           MOV     E,A
00F9 2A3420    164           LHLD    SAPPP+2*1AH
00FC B5        165           ORA     M              ,I/O INPUT #1A
00FD 210300 E  166           LXI     H,SA1BDS+3     ,ADDRESS OF INT. STOR. REG. #3
0100 F6        167           ORA     M
0101 F0        168           MOV     D,B
0102 210400    169           LXI     H,SA1BDS+4     ,ADDRESS OF INT. STOR. REG. #4
0105 CDF501    170           CALL    FLFLPC
0108 56        171           MOV     D,M
0109 2A3E20    172           LHLD    SAPPP+2*1FH
010C 72        173           MOV     M,D            ,I/O OUTPUT #1F
010D 73        174           MOV     A,E
010E 2F        175           CMA
010F A0        176           ANA     B
0110 2A3420    177           LHLD    SAPPP+2*1AH
0113 57        17*           MOV     D,A            ,I/O INPUT #1A
0114 7E        179           MOV     A,M
0115 1F        180           CMA
0116 6F        181           MOV     E,A
```

```
LOC OBJ          SEQ              SOURCE STATEMENT

0117 A2          182              ANA     D
0118 2A4020      183              LHLD    SAPPP+2*20H
011B 77          184              MOV     M,A         ,I/O OUTPUT #20
011C 2A3220      185              LHLD    SAPPP+2*19H
011F 7E          186              MOV     A,M         ,I/O INPUT #19
0120 A3          187              ANA     E
0121 47          188              MOV     B,A
0122 2A3020      189              LHLD    SAPPP+2*18H
0125 7E          190              MOV     A,M         ,I/O INPUT #18
0126 2F          191              CMA
0127 37          192              MOV     D,A
0128 A3          193              ANA     E
0129 2A4220      194              LHLD    SAPPP+2*21H
012C 77          195              MOV     M,A         ,I/O OUTPUT #21
012D 5F          196              MOV     E,A
012E 78          197              MOV     A,B
012F 2F          198              CMA
0130 82          199              ANA     D
0131 A1          200              ANA     C
0132 2A4420      201              LHLD    SAPPP+2*22H
0135 77          202              MOV     M,A         ,I/O OUTPUT #22
0136 7A          203              MOV     A,D
0137 2F          204              CMA
0138 50          205              ORA     B
0139 210300 E    206              LXI     H,SA1BDS+3  ,ADDRESS OF INT. STOR. REG. #3
013C E6          207              ORA     M
013D 57          208              MOV     D,A
013E 7E          209              MOV     A,M
013F 03          210              ORA     E
0140 2A4820      211              LHLD    SAPPP+2*24H
0143 77          212              MOV     M,A         ,I/O OUTPUT #24
0144 78          213              MOV     A,D
0145 51          214              MOV     D,C
0146 210500 E    215              LXI     H,SA1BDS+5  ,ADDRESS OF INT. STOR. REG. #5
0149 CDF501 C    216              CALL    FLFLPC
014C 7E          217              MOV     A,M
014D 2A4620      218              LHLD    SAPPP+2*23H
0150 77          219              MOV     M,A         ,I/O OUTPUT #23
0151 2A2820      220              LHLD    SAPPP+2*14H
0154 7E          221              MOV     A,M
0155 E601        222              ANI     01H
0157 EA5F01C     223              JZ      PROG1
015A 2A4A20      224              LHLD    SAPPP+2*25H
015D 3401        225              MVI     M,01
015F 2A3A20      226 PROG1:       LHLD    SAPPP+2*15H
0162 FE          227              MOV     A,M
0163 E601        228              ANI     01H
0165 CA6001 C    229              JZ      PROG2
0168 2A4A20      230              LHLD    SAPPP+2*25H
016B 3600        231              MVI     M,00
016D C30000 C    232 PROG2:       JMP     PROG
                 233
                 234              ***********************************************
                 235              ***********************************************
                 236              ----------START OF SUBROUTINES --------              Listing 2C
                 237              ***********************************************
                 238              ***********************************************
                 239
                 240
```

Listing 2c

```
LOC OBJ          SEQ              SOURCE STATEMENT

241              ,MULTIPLY BY 10 THE NUMBER THAT IS IN THE B&C REG. PAIR
                 242              ,RETURNS ANSWER IN B&C REG. PAIR
                 243
0170 E5          244 MULT10:      PUSH    H
0171 210000      245              LXI     H,00
0174 3E0A        246              MVI     A,0AH
0176 09          247 MULT11:      DAD     B
0177 3D          248              DCR     A
0178 027601      249              JNZ     MULT11
017B 44          250              MOV     B,H
117C 4D          251              MOV     C,L
117D E1          252              POP     H
117E 09          253              RET
                 254
                 255
                 256              ,TIME DELAY OUTPUT CONTROL ROUTINE
                 257              ,TIME DELAY ADDRESS EXPECTED IN H&L
                 258              ,ADDRESS OF T.D. PRESET VALUE EXPECTED IN D&E
                 259              , STATUS RETURNED IN ACCUM. ("1" TIMED OUT)
                 260
017F 05          261 TDOUTC:      PUSH    B
0180 7E          262              MOV     A,M
0181 FE80        263              CPI     A0H
0183 024001C     264              JNC     TDOUT2
0186 3600        265              MVI     M,00
0188 2B          266              DCX     H
```

| LOC | OBJ | SEQ | | SOURCE STATEMENT | | |
|---|---|---|---|---|---|---|
| 0189 | 3600 | 367 | | MVI | M,00 | |
| 018B | 23 | 268 | | INX | H | |
| 018C | B1 | 269 | TDOUT1: | POP | B | |
| 01BD | 3E02 | 270 | | MVI | A,02 | |
| 018F | C9 | 271 | | RET | | |
| 0190 | EB | 272 | TDOUT2 | XCHG | | |
| 0191 | 0600 | 273 | | MVI | B,00 | |
| 0193 | 7E | 274 | | MOV | A,M | |
| 0194 | FE80 | 275 | | CPI | 80H | |
| 0196 | DA9F01 C | 276 | | JC | TDOUT3 | |
| 0199 | E67F | 277 | | ANI | 7FH | |
| 019B | 4F | 278 | MOV | C,A | | |
| 019C | CD7001 C | 279 | | CALL | MULT10 | ;CALL MULTIPLY BY 10 ROUTINE (IN B&C) |
| 019F | 4F | 280 | TDOUT3: | MOV | C,A | |
| 01A0 | CD7001 C | 281 | | CALL | MULT10 | ;CALL MULTIPLY BY 10 ROUTINE (IN B&C) |
| 01A3 | EB | 282 | | XCHG | | |
| 01A4 | 7E | 283 | | MOV | A,M | |
| 01A5 | E67F | 284 | | ANI | 7FH | |
| 01A7 | B8 | 285 | | CMP | B | |
| 01A8 | CA6101 C | 286 | | JZ | TDOUT4 | |
| 01AA | 928901 C | 287 | | JNC | TDOUT5 | |
| 01AE | 039001 C | 288 | | JMP | TDOUT1 | |
| 01B1 | 2B | 289 | TDOUT4: | DCX | H | |
| 01B2 | 7E | 290 | | MOV | A,M | |
| 0133 | 33 | 291 | | INX | H | |
| 01B4 | 89 | 292 | | CMP | C | |
| 01B5 | DA6C01 | 293 | | JC | TDOUT1 | |
| 01B8 | 7E | 294 | | MOV | A,M | |
| 01B9 | F6C0 | 295 | TDOUT5: | ORI | 0C0H | |
| 01BB | 77 | 296 | | MOV | M,A | |
| 01EC | 01 | 297 | | POP | B | |
| 01BD | 3E01 | 298 | | MVI | A,01 | |
| 01BF | 09 | 299 | | RET | | |
| | | 300 | | | | |
| | | 301 | | | | |
| | | 302 | | ;TIME DELAY INPUT CONTROL ROUTINE | | |
| | | 303 | | ;TIME DELAY ADDRESS EXPECTED IN H&L | | |
| | | 304 | | ;IF ACCUM = "1" START T.D. ELSE STOP T.D. | | |
| | | 305 | | ;    FLAGS DESTROYED | | |
| | | 306 | | | | |
| | | 307 | | | | |
| 01C0 | C5 | 308 | TDINC: | PUSH | B | |
| 01C1 | 46 | 309 | | MOV | B,M | |
| 01C2 | 4F | 310 | | MOV | C,A | |
| 01C3 | 0F | 311 | | RRC | | |
| 01C4 | 78 | 312 | | MOV | A,B | |
| 01C5 | DACD01 C | 313 | | JC | TDINC1 | |
| 01C3 | E67F | 314 | | ANI | 7FH | |
| 01CA | C3CF01 C | 315 | | JMP | TDINC2 | |
| 01CD | F630 | 316 | TDINC1: | ORI | 80H | |
| 01CF | 77 | 317 | TDINC2: | MOV | M,A | |
| 01D079 | | 318 | | MOV | A,C | |
| 01D1 | C1 | 319 | | POP | B | |
| 01D2 | C9 | 320 | | RET | | |
| | | 321 | | | | |
| | | 322 | | ;FLASHER CONTROL ROUTINE | | |
| | | 323 | | ;FLASH TIME DELAY ADDRESS EXPECTED IN H&L | | |
| | | 324 | | ;RETURNS STATUS IN ACCUM "1" = NOT TIMED OUT, "0" = TIMED OUT | | |
| | | 325 | | | | |
| | | 326 | | | | |
| 01D3 | 76 | 327 | FLASHC: | MOV | A,M | |
| 01D4 | FE80 | 328 | | CPI | 00H | |
| 01D6 | D2E201 C | 329 | | JNC | FLASH3 | |
| 01D9 | 3600 | 330 | | MVI | M,00 | |
| 01DB | 2B | 331 | | DCX | H | |
| 01DC | 3600 | 332 | FLASH1: | MVI | M,00 | |
| 01DE | 23 | 333 | FLASH2: | INX | H | |
| 01DF | 3E01 | 334 | | MVI | A,01 | |
| 01E1 | C9 | 335 | | RET | | |
| 01E2 | 2B | 336 | FLASH3: | DCX | H | |
| 01E3 | 7E | 337 | | MOV | A,M | |
| 01E4 | FE05 | 338 | | CPI | 05 | |
| 01E6 | D2EC01 C | 339 | | JNC | FLASH4 | |
| 01E9 | C3DE01C | 340 | | JMP | FLASH2 | |
| 01EC | FE0A | 341 | FLASH4: | CPI | 10 | |
| 01EE | D2DC01 C | 342 | | JNC | FLASH1 | |
| 01F1 | 23 | 343 | | INX | H | |
| 01F2 | 3E02 | 344 | | MVI | A,02 | |
| 01F4 | C9 | 345 | | RET | | |
| | | 346 | | | | |
| | | 347 | | ;FLIP-FLOP (MEMORY GATE SIMILATOR) CONTROL ROUTINE | | |
| | | 348 | | ;FLIP-FLOP ADDRESS EXPECTED IN H&L | | |
| | | 349 | | ;RESET INPUT ("1" TO RESET) EXPECTED IN ACCUM. | | |
| | | 350 | | ;SET INPUT ("1" TO SET) EXPECTED IN D REG. | | |
| | | 351 | | ;THIS IS A "RESET OVERRIDE" FLIP-FLOP | | |
| | | 352 | | | | |
| | | 353 | | | | |
| 01F5 | 1F | 354 | FLFLPC: | RAR | | |
| 01F6 | D2FD01 C | 355 | | JNC | FLFLP1 | |
| 01F9 | 3600 | 356 | | MVI | M,00 | |
| 01FB | 17 | 357 | | RAL | | |
| 01FC | C9 | 358 | | RET | | |
| 01FD | 17 | 359 | FLFLP1: | RAL | | |
| 01FE | F5 | 360 | | PUSH | PSW | |
| 01FF | 7A | 361 | | MOV | A,D | |
| 0200 | 1F | 362 | | RAR | | |
| 0201 | D20602 C | 363 | | JNC | FLFLP2 | |
| 0204 | 3601 | 364 | | MVI | M,01 | |

```
LOC OBJ           SEQ            SOURCE STATEMENT

0206 F1           365 FLFLP2:    POP       PSW
0207 09           366            RET
                  367
                  368
                  369            ;THIS PROGRAM HAS NO RTRAP, CMDDEC, AND IERROR ROUTINES
                  370            ;HOWEVER TO WORK WHEN LINKED WITH FIRM WARE PROG. FW1
                  371            ;THE FOLLOWING INSTRUCTIONS MUST BE INCLUDED
                  372
0208 C9           373 RTRAP:     RET
0209 C9           374 CMDDEC:    RET
020A C30000 E     375            IERROR:   JMP       DATAR
                  376
                  377            END
```

Listing 3A

```
LOC OBJ    SEQ            SOURCE STATEMENT
           1     **************************************************
           2     *
           3     * EOB CONTROL LOOP PATCH PANEL PROM
           4     * PROGRAM (CORRESPONDS TO FIG. 6)
           5     *
           6     **************************************************
           7
           8            NAME      C701B2
           9            ASEG
2000       10           ORG       2000H
           11
2000 80E8  12           DW        0E880H     ;AUTO TRIP INDICATION          -0
2002 3BE0  13           DW        0E03BH     ;STOPPED                       -1
2004 80E8  14           DW        0E880H     ;AUTO TRIP INDICATION          -2
2006 3AE0  15           DW        0E03AH     ;RUNNING                       -3
2008 3AE0  16           DW        0E03AH     ;    "                         -4
200A 3EE0  17           DW        0E03EH     ;PWR STATUS                    -5
200D 10E0  18           DW        0E010H     ;START SW.                     -6
200E 11E0  19           DW        0E011H     ;STOP SW                       -7
2010 11E0  20           DW        0E011H     ;    "                         -8
2012 80E8  21           DW        0E880H     ;AUTO TRIP INDICATION          -9
2014 3FE0  22           DW        0E03FH     ;CONTINUITY STATUS             -0A
2016 3FE0  23           DW        0E03FH     ;    "                         -0B
2018 10E0  24           DW        0E010H     ;START SW                      -0C
201A 19E0  25           DW        0E019H     ;STOPPED LIGHT (OUTPUT)        -0D
201C 18E0  26           DW        0E018H     ;RUNNING LIGHT (OUTPUT)        -0E
201E 80E8  27           DW        0E880H     ;AUTO TRIP INDICATION (OUTPUT) -0F
2020 20E0  28           DW        0E020H     ;MALFUNCTION ALARM (OUTPUT)    -10
2022 0500  29           DW        00003H     ;TRAVEL TIMER PRESET (3 SEC.)  -11
2024 0300  30           DW        00003H     ;TD #2 PRESET (3SEC.)          -12
2026 0300  31           DW        00003H     ;TD #5 PRESET (5 SEC.)         -13
2028 1020  32           DW        0E010H     ;START SW.                     -14
202A 11E0  33           DW        0E011H     ;STOP SW.                      -15
202C 30E0  34           DW        0E03CH     ;BKR IN TEST POS.              -16
202E FFFF  35           DW        0FFFFH     ;SPARE                         -17
2030 FFFF  36           DW        0FFFFH     ;SPARE                         -18
2172 FFFF  37           DW        0FFFFH     ;SPARE                         -19
2034 FFFF  38           DW        0FFFFH     ;SPARE                         -18
2036 FFFF  39           DW        0FFFFH     ;SPARE                         -18
2038 39E0  40           DW        0E039H     ;START COMMAND (OUTPUT)        -1C
203A 38E0  41           DW        0E038H     ;STOP COMMAND (OUTPUT)         -1D
203C 1AE0  42           DW        0E01AH     ;BKR IN TEST POS. (LIGHT OUTPUT)-1E
203E FFFF  43           DW        0FFFFH     ;SPARE                         -1F
2040 FFFF  44           DW        0FFFFH     ;SPARE                         -20
2042 FFFF  45           DW        0FFFFH     ;SPARE                         -21
2044 FFFF  46           DW        0FFFFH     ;SPARE                         -22
2046 FFFF  47           DW        0FFFFH     ;SPARE                         -23
2048 FFFF  48           DW        0FFFFH     ;SPARE                         -24
204A FFFF  49           DW        0FFFFH     ;SPARE                         -25
           50
           51           END
```

Listing 3B

| LOC OBJ | SEQ | SOURCE STATEMENT | | | |
|---|---|---|---|---|---|
| | 1 | ;********************************************************** | | | |
| | 2 | ;* | | | * |
| | 3 | ;* MCC,ERD,SOV, CONTROL LOOP PATCH PANEL PROM | | | * |
| | 4 | ;* PROGRAM (CORRESPONDS TO FIGS. 2, 3 & 7) | | | * |
| | 5 | ;* | | | * |
| | 6 | ;********************************************************** | | | |
| | 7 | | | | |
| | 8 | NAME | C70182 | | |
| | 9 | ASEG | | | |
| 2000 | 10 | ORG | 2000H | | |
| | 11 | | | | |
| 2000 80E8 | 12 | DW | 0E880H | ,AUTO TRIP INDICATION | -0 |
| 2002 36E0 | 13 | DW | 0E038H | ,STOPPED | -1 |
| 2004 00E0 | 14 | DW | 0E880H | ,AUTO TRIP INDICATION | -2 |
| 2006 80E0 | 15 | DW | 0E03AH | ,RUNNING | -3 |
| 2008 3AE0 | 16 | DW | 0E03AH | ,    " | -4 |
| 200A 3EE0 | 17 | DW | 0E03EH | ,PWR STATUS | -5 |
| 200C 10E0 | 18 | DW | 0E010H | ,START SW. | -6 |
| 200E 11E0 | 19 | DW | 0E011H | ,STOP SW. | -7 |
| 2010 11E0 | 20 | DW | 0E011H | ,    " | -8 |
| 2012 80E8 | 21 | DW | 0E880H | ,AUTO TRIP INDICATION | -9 |
| 2014 3FE0 | 22 | DW | 0E03FH | ,CONTINUITY STATUS | -0A |
| 2016 3FE0 | 23 | DW | 0E03FH | ,    " | -0B |
| 2018 10E0 | 24 | DW | 0E010H | ,START SW | -0C |
| 201A 10E0 | 25 | DW | 0E019H | ,STOPPED LIGHT (OUTPUT) | -0D |
| 201C 10E0 | 26 | DW | 0E018H | ,RUNNING LIGHT (OUTPUT) | -0E |
| 201E 80E8 | 27 | DW | 0E080H | ,AUTO TRIP INDICATION (OUTPUT) | -0F |
| 2020 80E0 | 28 | DW | 0E020H | ,MALFUNCTION ALARM (OUTPUT) | -10 |
| 2022 0300 | 29 | DW | 00005H | ,TRAVEL TIMER RESET (5 SEC.) | -11 |
| 2024 0300 | 30 | DW | 00003H | ,TD #2 PRESET (3 SEC.) | -12 |
| 2026 0500 | 31 | DW | 00005H | ,TD #5 PRESET (5 SEC.) | -13 |
| 2029 10E0 | 32 | DW | 0E010H | ,START SW | -14 |
| 202A 11E0 | 33 | DW | 0E011H | ,STOP SW. | -15 |
| 202C FFFF | 34 | DW | 0FFFFH | ,SPARE | -16 |
| 202E FFFF | 35 | DW | 0FFFFH | ,SPARE | -17 |
| 2030 FFFF | 36 | DW | 0FFFFH | ,SPARE | -18 |
| 2032 FFFF | 37 | DW | 0FFFFH | ,SPARE | -19 |
| 2034 FFFF | 38 | DW | 0FFFFH | ,SPARE | -1A |
| 2036 FFFF | 39 | DW | 0FFFFH | ,SPARE | -1B |
| 2028 FFFF | 40 | DW | 0FFFFH | ,SPARE | -1C |
| 203A FFFF | 41 | DW | )FFFFH | ,SPARE | -1D |
| 203C FFFF | 42 | DW | 0FFFFH | ,SPARE | -1E |
| 203E FFFF | 43 | DW | 0FFFFH | ,SPARE | -1F |
| 2040 FFFF | 44 | DW | 0FFFFH | ,SPARE | -20 |
| 2042 FFFF | 45 | DW | 0FFFFH | ,SPARE | -21 |
| 2044 FFFF | 46 | DW | 0FFFFH | ,SPARE | -22 |
| 2046 FFFF | 47 | DW | 0FFFFH | ,SPARE | -23 |
| 2048 FFFF | 48 | DW | 0FFFFH | ,SPARE | -24 |
| 204A 39E0 | 49 | DW | 0E039H | ,START/STOP COMMAND (OUTPUT) | -25 |
| | 50 | | | | |
| | 51 | END | | | |

Listing 3C

| LOC OBJ | SEQ | SOURCE STATEMENT | | | |
|---|---|---|---|---|---|
| | 1 | ;********************************************************** | | | |
| | 2 | ;* | | | * |
| | 3 | ;* MOV(MOMENTARY) CONTROL LOOP PATCH PANEL PROM | | | * |
| | 4 | ;* PROGRAM (CORRESPONDS TO FIG. 5) | | | * |
| | 5 | ;* | | | * |
| | 6 | ;********************************************************** | | | |
| | 7 | | | | |
| | 8 | NAME | C781B2 | | |
| | 9 | ASEG | | | |
| 2000 | 10 | ORG | 2000H | | |
| | 11 | | | | |
| 2000 80E8 | 12 | DW | 0E880H | ,AUTO TRIP INDICATION | -0 |
| 2002 33E0 | 13 | DW | 0E03BH | ,CLOSED | -1 |
| 2004 01E8 | 14 | DW | 0E881H | , | -2 |
| 2006 80E8 | 15 | DW | 0E080H | ,AUTO TRIP INDICATION | -3 |
| 2008 3AE0 | 16 | DW | 0E03AH | ,OPENED | -4 |
| 200A 3EE0 | 17 | DW | 0E03EH | ,PWR STATUS | -5 |
| 200C 10E0 | 18 | DW | 0E010H | ,OPEN SW. | -6 |
| 200E 11E0 | 19 | DW | 0E011H | ,CLOSE SW. | -7 |
| 2010 11E0 | 20 | DW | 0E011H | ,    " | -8 |
| 2012 01EB | 21 | DW | 0E381H | , | -9 |
| 2014 3FE0 | 22 | DW | 0E03FH | ,CONTINUITY STATUS | -0A |
| 2016 3FE0 | 23 | DW | 0E03FH | ,    "           " | -0B |
| 2018 10E0 | 24 | DW | 0E010H | ,OPEN SW. | -0C |
| 201A 19E0 | 25 | DW | 0E019H | ,CLOSED LIGHT (OUTPUT) | -0D |
| 201C 10E0 | 26 | DW | 0E018H | ,OPENED LIGHT (OUTPUT) | -0E |
| 201E FFFF | 27 | DW | 0FFFFH | ,SPARE | -0F |
| 2020 20E0 | 28 | DW | 0E020H | ,MALFUNCTION ALARM (OUTPUT) | -10 |
| 2022 0500 | 29 | DW | 00005H | ,TRAVEL TIMER PRESET (5 SEC.) | -11 |
| 2034 0300 | 30 | DW | 00003H | ,TD #2 PRESET (3 SEC.) | -12 |

```
LOC OBJ         SEQ             SOURCE STATEMENT 2026 0500       31              DW      00005H          ,TD #5 PRESET (5 SEC.)          -13
2008 10E0       32              DW      0E010H          ,OPEN SW.                       -14
200A 11E0       33              DW      0E011H          ,CLOSE SW.                      -15
202C FFFF       34              DW      0FFFFH          ,SPARE                          -16
202E 30E0       35              DW      0E03DH          ,OPEN T.S.                      -17
2030 36E0       36              DW      0E03BH          ,CLOSED                         -18
2032 30E0       37              DW      0E03CH          ,CLOSED T.S.                    -19
2034 3AE0       38              DW      0E03AH          ,OPEN                           -1A
2036 12E0       39              DW      0E012H          ,STOP SW.                       -1B
2038 FFFF       40              DW      0FFFFH          ,SPARE                          -1C
203A FFFF       41              DW      0FFFFH          ,SPARE                          -1D
203C FFFF       42              DW      0FFFFH          ,SPARE                          -1E
203E FFFF       43              DW      0FFFFH          ,SPARE                          -1F
2040 39E0       44              DW      0E039H          ,OPEN COMMAND (OUTPUT)          -20
2042 60E0       45              DW      0E060H          ,AUTO TRIP INDICATION (OUTPUT)  -21
2044 38E0       46              DW      0E038H          ,CLOSE COMMAND (OUTPUT)         -22
2046 FFFF       47              DW      0FFFFH          ,SPARE                          -23
2048 FFFF       48              DW      0FFFFH          ,SPARE                          -24
204A FFFF       49              DW      0FFFFH          ,                               -25
                50
                51              END

Listing 3D

LOC OBJ         SEQ             SOURCE STATEMENT

1               ,*****************************************************
                2               ,*                                                   *
                3               ,*  MOV(LATCHING CONTROL)LOOP PATCH PANEL FROM       *
                4               ,*  PROGRAM(CORRESPONDS TO FIG. 4)                   *
                5               ,*                                                   *
                6               ,*****************************************************
                7
                8               NAME    C78102
                9               ASEG
2000            10              ORG     2000H
                11
2000 30E8       12              DW      0E880H          ,AUTO TRIP INDICATION           -0
2002 38E0       13              DW      0E038H          ,CLOSED                         -1
2004 80E8       14              DW      0E880H          ,AUTO TRIP INDICATION           -2
2006 3AE3       15              DW      0E03AH          ,OPENED                         -3
2008 3AE0       16              DW      0E03AH          ,   "                           -4
200A 3EE0       17              DW      0E03EH          ,PWR STATUS                     -5
200C 10E0       18              DW      0E010H          ,OPEN SW.                       -6
200E 11E0       19              DW      0E011H          ,CLOSE SW.                      -7
221D 11E0       20              DW      0E011H          ,   "                           -8
2012 80E8       21              DW      0E880H          ,AUTO TRIP INDICATION           -9
2014 3FE0       22              DW      0E03FH          ,CONTINUITY STATUS              -0A
2016 3FE0       23              DW      0E03FH          ,   "                           -0B
2018 10E0       24              DW      0E010H          ,OPEN SW.                       -0C
201A 19E0       25              DW      0E019H          ,CLOSED LIGHT (OUTPUT)          -0D
201C 18E0       26              DW      0E018H          ,OPENED LIGHT (OUTPUT)          -0E
201E 80E8       27              DW      0E880H          ,AUTO TRIP INDICATION (OUTPUT)  -0F
2020 20E0       28              DW      0E020H          ,MALFUNCTION ALARM (OUTPUT)     -10
2022 0500       29              DW      00005H          ,TRAVEL TIMER PRESET (5 SEC.)   -11
2024 0300       30              DW      00003H          ,TD #2 PRESET (3 SEC.)          -12
2016 0500       31              DW      00005H          ,TD #5 PRESET (5 SEC.)          -13
2023 10E0       32              DW      0E010H          ,OPEN SW.                       -14
2028 11E0       33              DW      0E011H          ,CLOSE SW.                      -15
3020 FFFF       34              DW      0FFFFH          ,SPARE                          -16
202E 3DE0       35              DW      0E03DH          ,OPEN T.S.                      -17
2030 3BE0       36              DW      0E03BH          ,CLOSED                         -18
2032 30E0       37              DW      0E03CH          ,CLOSED T.S.                    -19
2034 3AE0       38              DW      0E03AH          ,OPEN                           -1A
2036 12E0       39              DW      0E012H          ,STOP SW.                       -1B
2038 FFFF       40              DW      0FFFFH          ,SPARE                          -1C
203A FFFF       41              DW      0FFFFH          ,SPARE                          -1D
203C FFFF       42              DW      0FFFFH          ,SPARE                          -1E
203E 30E0       43              DW      0E039H          ,OPEN COMMAND (OUTPUT)          -1F
2040 FFFF       44              DW      0FFFFH          ,SPARE                          -20
2042 FFFF       45              DW      0FFFFH          ,SPARE                          -21
2044 FFFF       46              DW      0FFFFH          ,SPARE                          -22
2046 38E0       47              DW      0E038H          ,CLOSE COMMAND (OUTPUT)         -23
2048 1BE0       48              DW      0E01BH          ,TRAVEL STOPPED (OUTPUT)        -24
204A FFFF       49              DW      0FFFFH          ,                               -25
                50
                51              END
```

We claim:

1. A distributed computer control system for controlling a plurality of controlled devices comprising:
a plurality of control computers each connected, respectively, to individual ones of a plurality of controlled devices for providing control thereto, each of said control computers having a central processor adapted to address a plurality of locations including memory locations and input/output port locations and adapted to operate in an indirect addressing mode, and each of said controlled devices connected to its respective control computer through input/output ports and having a particular set of logic functions and/or command sequences to effect control thereof;

said computers connected to one another and to a central, supervisory computer through a data highway, said supervisory computer adapted to selectively monitor the function of each of said control computers;

each computer having a first set of predetermined memory locations containing instructions for effecting the logic control functions and/or command sequences of all the controlled devices that exist within the system, some of said instructions causing said central processor to address a second, predetermined set of memory locations in order to obtain input signal information and provide output signal information to effect all of said logic control functions and/or command sequences;

selected ones of said second set of memory locations in each control computer that correspond to the logic control functions and/or command sequences of the respective controlled device containing the input/output port addresses of said respective controlled device such that the logic control functions and/or command sequence portions of the instructions in said first set of memory locations that relate to the respective controlled device are operative through said selected ones of said second set of memory locations to receive input signal information from and provide output signal information to said respective controlled device; and the remaining ones of said second set of memory locations containing addresses chosen so that the logic control functions and/or command sequence portions of said instructions in said first set of locations that do not correspond to the logic control function and/or command sequences of the respective controlled device effect no logic control over said respective controlled device as a result of said so-chosen addresses in the remaining ones of said second set of memory locations.

2. The computer system claimed in claim 1, wherein:

said computers are divided into a predetermined number of groups of P control computers, said control computers selectively addressed by said central, supervisory computer through a plurality of address busses of said data highway;

a first and a second address buss providing, respectively, a one-of-M and a one-of-N decoded output to M terminations and N terminations on a jumper pad;

first and second jumper links connected, respectively, from a selected one of said M terminations and a selected one of said N terminations to the input of a coincidence gate, said gate providing an output when coincidence occurs between the selected M output and the selected N output;

an undecoded binary address buss connected to a one-of-P decoder, the P outputs of said decoders connected, one-by-one, to said P control computers within said predetermined group; and said gate connected to said one-of-P decoder to provide an enabling signal thereto to enable said one-of-P decoder to select a particular one of said predetermined group of P control computers when coincidence occurs between said selected M and said selected N outputs.

3. A distributed computer control system for a plurality of controlled devices comprising:

a control computer connected through input/output ports to a controlled device for providing control thereto, said controlled device having a set of logic control functions and/or command sequences associated therewith;

at least one other control computer connected through input/output ports to another controlled device for providing control thereto;

said other controlled device having another set of logic control functions and/or command sequences associated therewith, different from those of said first-mentioned controlled device;

said first-mentioned and said other control computer connected to one another and to a central, supervisory computer through a data highway, said supervisory computer adapted to selectively monitor the functioning of each of said control computers;

each control computer having a central processor adapted to address a plurality of locations including memory locations and input/output port locations and adapted to operate in an indirect addressing mode;

each computer having a first set of predetermined memory locations containing identical instructions for effecting the logic control functions and/or command sequences of the controlled devices that exist within the system;

some of said instructions causing each of said central processors to address a second, predetermined set of memory locations in order to obtain input signal information and provide output signal information to effect all of the logic control functions and/or command sequences;

selected ones of said second set of memory locations in said first-mentioned control computer that correspond to the logic control functions and/or command sequences of said first-mentioned controlled device containing the input/output port addresses of said first-mentioned controlled device such that the logic control functions and/or command sequence portions of said instructions that correspond to the logic control functions and/or command sequences of said first-mentioned controlled device are operative through said selected second memory locations in said first-mentioned control computer to provide control to said first-mentioned controlled device;

the remaining ones of said second set of memory locations in said first mentioned control computer containing address information chosen such that the instructions in said first memory locations of said first mentioned control computer that do not correspond to the logic control functions and/or command sequences of said first mentioned controlled device have no control effect on said first mentioned controlled device as a consequence of the so-chosen address information;

selected ones of said second set of memory locations in said other control computer that correspond to the logic control functions and/or command sequences of said other controlled device containing the input/output port addresses of said other controlled device such that the logic control functions and/or command sequence portions of said instructions that correspond to the logic control functions and/or command sequences of said other controlled device are operative through said selected ones of said second memory locations of said other control computer to provide control to said other controlled device;

the remaining ones of said second set of memory locations in said other control computer containing address information chosen such that the instructions in said first memory locations of said other control computer that do not correspond to the logic control functions and/or command sequences of said other controlled device have no control effect on said other controlled device as a consequence of the so-chosen address information.

4. The computer control system claimed in claims 1 or 3, wherein:
said first set of predetermined memory locations for each computer are contained within a first read only memory; and
said second set of predetermined memory locations for each computer are contained within a second read only memory.

5. The control system claimed in claim 4, wherein:
said second read only memory is a field-programmable read only memory mounted in a plug-type socket.

6. The computer control system claimed in claims 1 or 3, wherein:
said central processors function in an indirect addressing mode when addressing said second memory locations.

7. The computer control system claimed in claims 1 or 3, wherein:
said logic control function and/or command sequences include providing momentary start and stop output command signals in response, respectively, to input start and stop signals.

8. The computer control system claimed in claims 1 or 3, wherein:
said logic control functions and/or command sequences include providing latched start and stop output command signals in response to, respectively, momentary start and stop input signals.

9. The computer control system claimed in claims 1 or 3, wherein:
said logic functions and/or command sequences include providing an alarm output signal in response to a failure to respond, loss of power, or loss of continuity input signal.

10. The computer control system claimed in claims 1 or 3, wherein:
said logic control functions and/or command sequences include providing an output signal to an indicator to indicate that a device has responded as commanded.

11. The computer control system claimed in claims 1 or 3, wherein:
the logic control functions and/or command sequences include providing a signal to an indicator to indicate that a controlled device has not responded as commanded.

12. In a distributed, multi-computer control system of the type having a plurality of control computers each connected through input/output ports to a plurality of respective controlled devices in which the control computers are connected to each other and to a central, supervisory computer through a data highway and in which each control computer includes a memory and a central processor that is adapted to address both memory locations and input/output port locations and also adapted to operate in an indirect addressing mode and in which each controlled device has a particular set of logic control functions and/or command sequences associated therewith to effect control thereof, the method of adapting each of said control computers to their respective controlled devices comprising the steps of:

providing, in a first set of predetermined memory locations of each of said computers, a set of instructions adapted to effect control of the logic control functions and/or command sequences of all the controlled devices that exist in the system, some of said instructions causing said processor to address a second, predetermined set of memory locations for receiving input signal information and providing output signal information to effect all of said logic control functions and/or sequences;

providing, in selected ones of said second set of said memory locations of a respective control computer that correspond to the logic control functions and/or command sequences of a respective controlled device, the input/output port address information of the respective controlled device such that the logic control functions and/or command sequence portions of said instructions that correspond to the logic control function and/or command sequences of said respective controlled device are operative through said input/output port addresses in said selected ones of said second memory locations to provide control to said respective controlled device; and providing, in the remaining ones of said second set of memory locations, address information chosen such that the instructions in said first memory location of said respective control computer that do not correspond to the logic control functions and/or command sequences of the respective controlled device have no control effect on the respective controlled device as a consequence of the so-chosen address information.

13. In a distributed, multi-computer control system of the type having a control computer connected through input/output ports to a controlled device and at least one other control computer through input/output ports to another controlled device, the first-mentioned and the other control computer connected to one another and to a central, supervisory computer through a data highway, each of said computers having a memory and a central processor that is adapted to address both memory locations and input/output port locations and also adapted to operate in an indirect addressing mode, and each of said controlled devices having a particular, different set of logic control function and/or command sequences associated therewith to effect control thereof, the method of adapting each of said control computers to their respective controlled devices comprising the steps of:

providing, in a first set of predetermined memory locations of said first-mentioned and said other control computer, an identical set of instructions adapted to effect control of the logic control functions and/or command sequences of said first-mentioned and said other controlled device, some of said instructions causing the respective central processors to address a second, predetermined set of memory locations in the respective memories for receiving input signal information and for providing output signal information to effect the respective logic control functions and/or command sequences;

providing, in selected ones of said second set of memory locations of said first-mentioned control computer corresponding to the logic control function and/or command sequences of said first-mentioned controlled device, the input/output port address information of said first-mentioned controlled device such that the logic control functions and/or command sequences portions of said instructions that correspond to the logic control functions and/or command sequences of said first-mentioned controlled device are operative through said input/output port address information in said selected ones of said second memory locations of said first-mentioned control computer to provide control to said first-mentioned controlled device;

providing, in selected ones of said second set of memory locations of said other control computer corresponding to the logic control functions and/or command sequences of said other controlled device, the input/output port address information of said other controlled device such that the logic control functions and/or command sequence portion of said instructions that correspond to the logic control functions and/or command sequence of said other controlled device are operative through said input/output port address information in said selected ones of said second memory location of said other control computer to provide control to said other controlled device;

providing, in the remaining ones of said second set of memory locations of said first-mentioned computer, address information chosen such that the logic control functions and/or command sequence portions of the instructions in said first memory locations of said first-mentioned computer that do not relate to the logic control functions and/or command sequences of said first-mentioned controlled device have no control effect on said first-mentioned controlled device as a consequence of the so-chosen address information; and providing, in the remaining ones of said second set of memory locations of said other control comouter, address information chosen such that the logic control function and/or command sequence portions of the instructions in said first memory locations of said other control computer that do not relate to the logic control functions and/or command sequences of said other controlled device have no control effect on said other controlled device as a consequence of the so-chosen address information.

* * * * *